United States Patent [19]

Mitsuoka et al.

[11] Patent Number: 5,528,702
[45] Date of Patent: Jun. 18, 1996

[54] OPTICAL PATTERN RECOGNITION APPARATUS WITH COORDINATE CONVERSION FUNCTION

[75] Inventors: Yasuyuki Mitsuoka; Tadao Iwaki, both of Tokyo, Japan

[73] Assignees: Seiko Instruments Inc.; Sumitomo Osaka Cement Co., Ltd., both of Japan

[21] Appl. No.: 886,331

[22] Filed: May 20, 1992

[30] Foreign Application Priority Data

May 31, 1991 [JP] Japan ................................. 3-129356
Jun. 11, 1991 [JP] Japan ................................. 3-139248

[51] Int. Cl.[6] ........................................................ G06K 9/76
[52] U.S. Cl. ........................ 382/211; 382/280; 382/278; 382/294
[58] Field of Search .............................. 382/32, 42, 43, 382/44, 211, 280, 278, 294, 210

[56] References Cited

U.S. PATENT DOCUMENTS 5,216,541 6/1993 Takesue ........................... 382/42

FOREIGN PATENT DOCUMENTS 3635688 5/1988 Germany ....................... G06K 9/76

OTHER PUBLICATIONS

Casasent. "Real Time Deformation Invariant Optical . . . " Applied Optics; Mar. 1987.
Hudson: "Joint Transform Correlation Using An Optically . . . " Applied Optics; Mar. 10, 1990.
Hossack. "Coordinate Transformations with Multiple . . . " Journal of Modern Optics, vol. 34, No. 9, 1987.
Yu. "Application of a Microchannel Spatial Light . . . " Proceedings of the SPIE: Optical Engineering. vol. 963 pp. 322-326 1989.
Applied Optics, vol. 15, No. 22 Nov. 1989 New York, NY, pp. 4725-4727 F.T.S. Yu et al., "Rotation invariant pattern recognition with a programmable joint transformcorrelator".
Telecommunications and Radio Engineering, vol. 44, No. 5, 1989, Washington, DC, pp. 50-52, A. M. Bereznyy et al., "A pattern recognition system using polar-logarithmic image conversion".
Proc. Computer and Optically Formed Holographic Optics, vol. 1211, Jan. 15, 1990, Los Angeles, CA, pp. 284-295, T. Iwaki et al., "Optical pattern recognition with LAPS-SLM (II)/feedback joint transform correlator using LAPS-SLM".

*Primary Examiner*—Leo Boudreau
*Assistant Examiner*—David R. Anderson
*Attorney, Agent, or Firm*—Adams & Wilks

[57] ABSTRACT

An optical pattern recognition apparatus has an optical coordinate converter unit which simultaneously and in parallel converts an entered reference image and an entered input image from an entered coordinate system to a desired coordinate system to produce a coordinate-converted reference image and a coordinate-converted input image. A joint transform correlator receives the coordinate-converted reference image and the coordinate-converted input image and generates a correlation coefficient between the coordinate-converted reference image and the coordinate-converted input image so that a correlation between each entered reference and each entered input image is obtained to effect pattern recognition in real time. A feedback circuit normalizes the generated correlation coefficient between the coordinate-converted reference image and the coordinate-converted input image with a maximum correlation coefficient. The feedback circuit changes a subsequently generated correlation coefficient between the coordinate-converted reference image and the coordinate-converted input image depending on the normalized correlation coefficient so that, if the coordinate-converted reference image is obtained from a plurality of entered reference images, a particular entered reference image having the highest correlation with the entered input image is systematically obtained.

28 Claims, 8 Drawing Sheets

FIG. 3 PRIOR ART
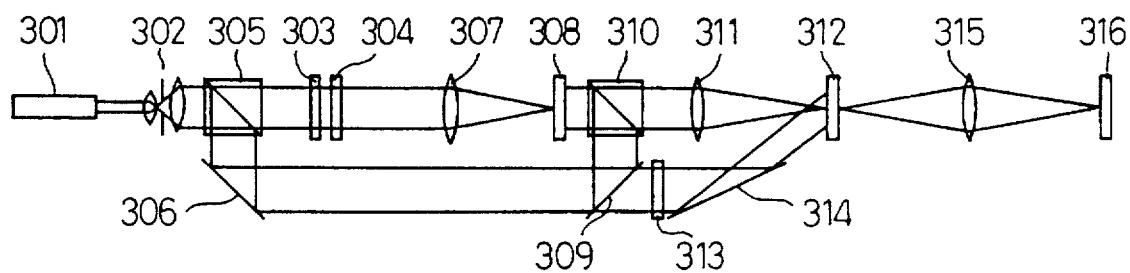
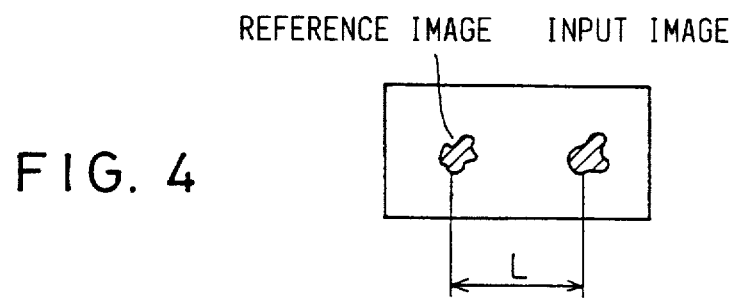
FIG. 4
FIG. 5
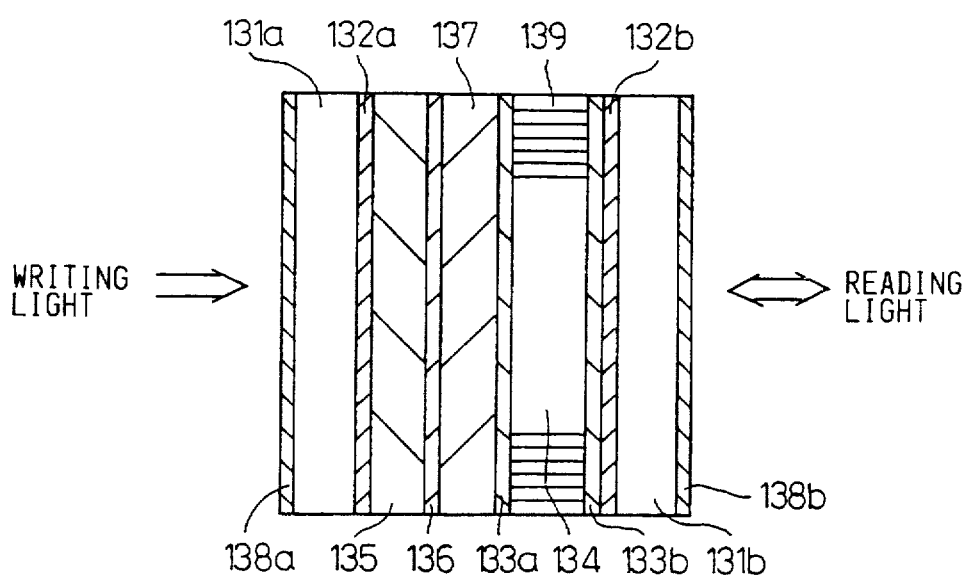

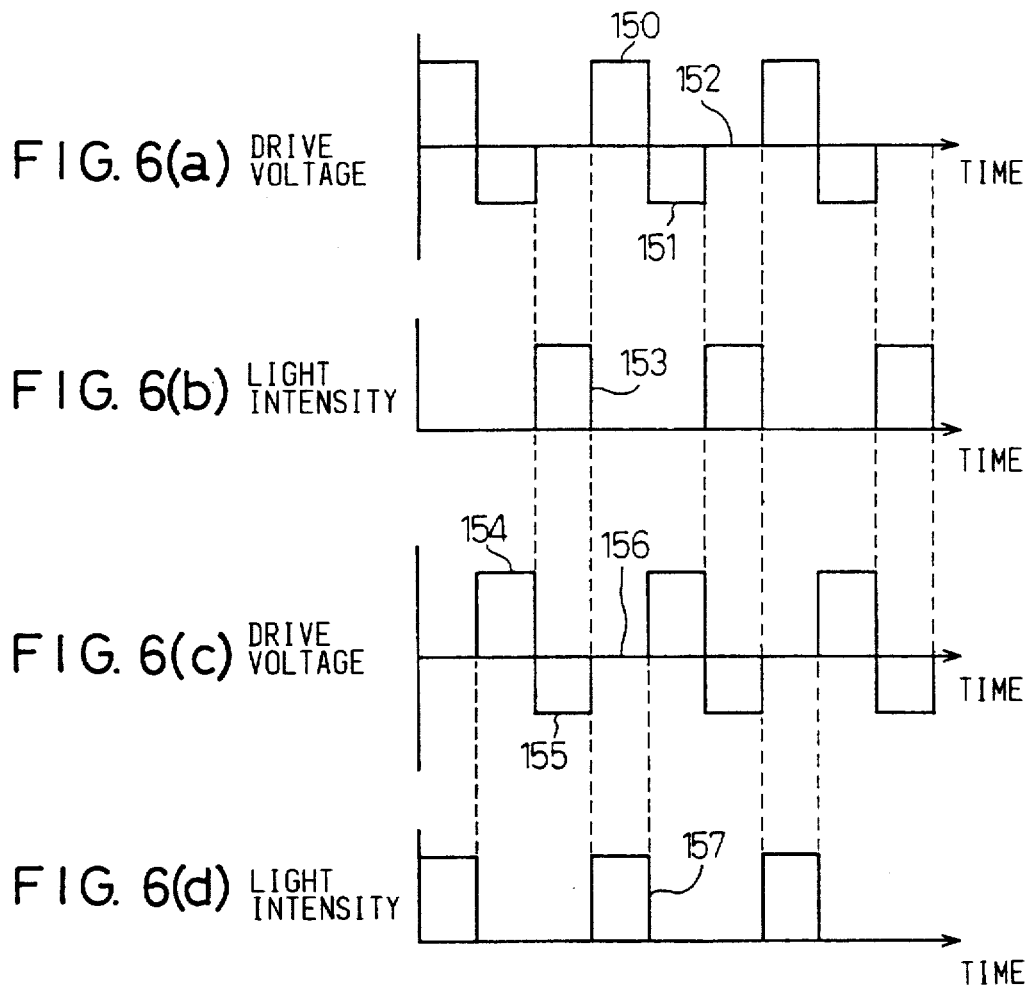
FIG. 6(a) DRIVE VOLTAGE
FIG. 6(b) LIGHT INTENSITY
FIG. 6(c) DRIVE VOLTAGE
FIG. 6(d) LIGHT INTENSITY
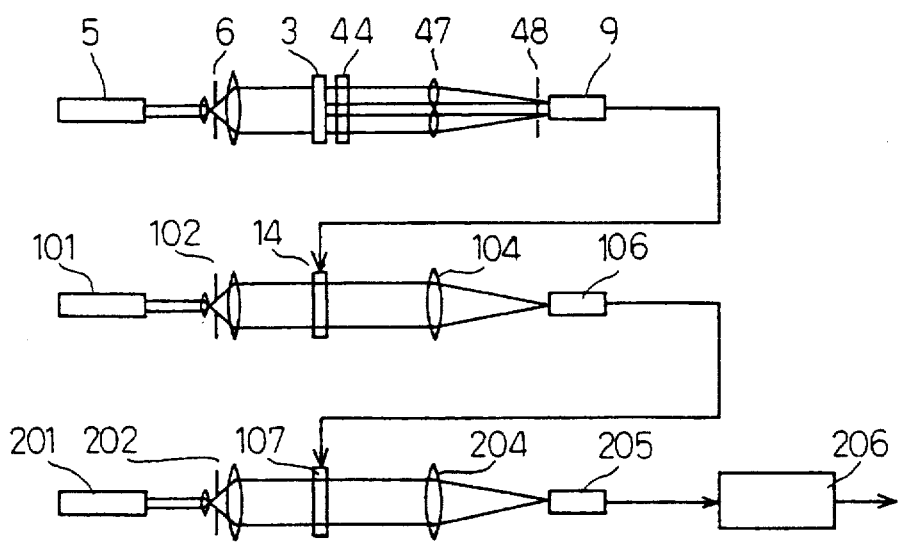
FIG. 7

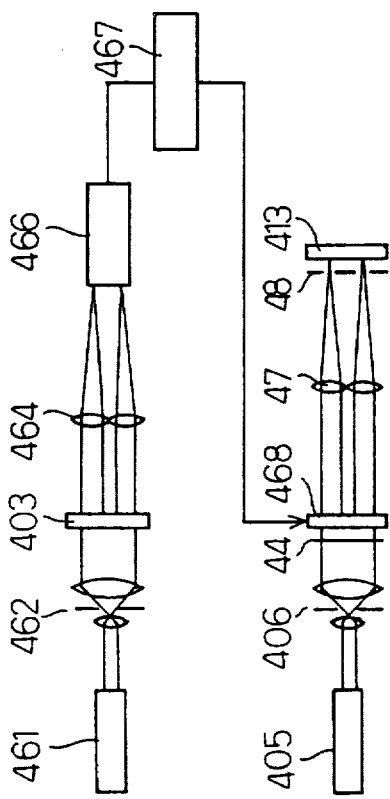
F I G. 17
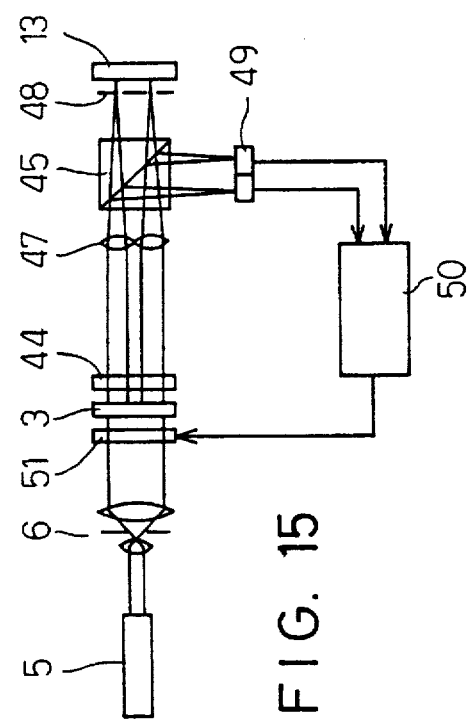
F I G. 15
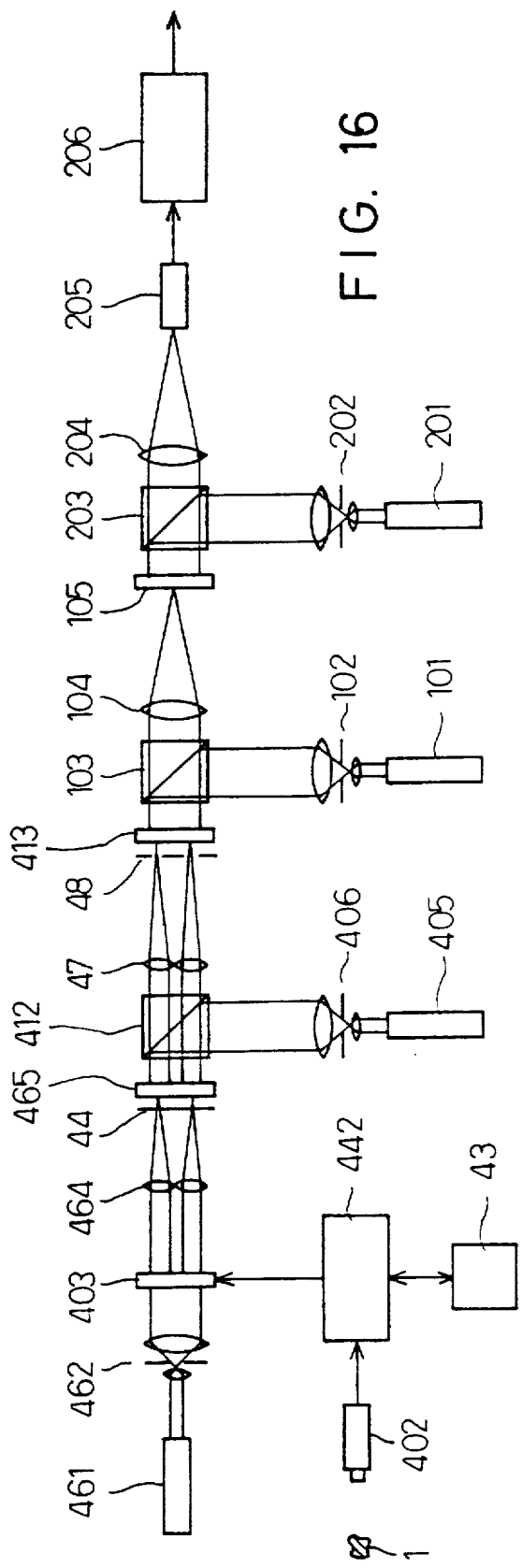
F I G. 16

BARYCENTER G    BARYCENTER G'

OPTICAL PATTERN RECOGNITION APPARATUS WITH COORDINATE CONVERSION FUNCTION

BACKGROUND OF THE INVENTION

In the field of optical information processing and optical measurement, the present invention relates to an apparatus which uses coherent light beams to perform optical coordinate conversion and optical correlation processing on two-dimensional images obtained from photographing devices such as CCD cameras.

Among conventional correlators that perform optical pattern recognition, methods using VanderLugt type and Joint Transform type correlators are well known. Either method is based on an optical Fourier transform using lens, so that an input image to be identified, when parallelly moved, can be recognized without a problem (shift invariability). When the input image is rotated or its size changed, the correlation peak intensity described later is not invariable and the recognition capability is found to degrade according to the extent of the rotation and size change.

In conventional apparatuses, when objects—such as characters or device parts whose shapes, sizes, directions and positions differ from one object to another—are to be optically measured and identified, the following steps are generally followed. The input object is first converted into a two-dimensional image (input image); second, when there is any rotation or size change found with the input image, the input image is converted into a desired coordinate system where the correlation peak intensity becomes invariable for such changes as rotation or size changes required for the recognition of the input image; and third, the coordinate-converted image is then measured or identified.

Various coordinate conversions may be used according to specific purposes. For the recognition processing and the rotating angle measurement of objects with differing directions, a polar coordinate conversion is employed. For objects both with differing directions and sizes, the recognition processing, the rotating angle processing and the magnification measurement are performed by means of coordinate conversion from (x, y) coordinates to (lnr, θ) coordinates. r and θ represent a radius vector and a declination in the polar coordinates.

First, the outline of the optical coordinate conversion method is shown in FIG. 2. With this method, a liquid crystal television 303 displaying an image to be converted and a coordinate conversion optical filter 304 are put close together at the front focal plane of a coordinate conversion lens 307. A parallel-ray coherent beam is radiated from behind the liquid crystal television 303 to form a desired coordinate-converted image on a liquid crystal light valve 308 placed on the rear focal plane of the coordinate conversion lens 307. The coordinate conversion optical filter 304 is made by using a computer generated hologram (CGH). Either of the liquid crystal television 303 or the coordinate conversion optical filter 304 may be placed in front of the other as long as they are put close together.

The liquid crystal light valve 308 commonly uses a TN liquid crystal as the light modulating material. Instead of the liquid crystal light valve 308, a light-addressed spatial light modulator may be used, which employs a BSO crystal ($Bi_{12}SiO_{20}$) as the light modulating material. The coordinate-converted image is thrown onto the spatial light modulator to display and store the coordinate-converted image, and then the coherent light is irradiated onto the spatial light modulator to read out the coordinate-converted image for such processing as the pattern recognition. Another method is also available, which involves using a photographing device such as a CCD camera instead of the light-addressed spatial light modulator to receive the coordinate-converted image and then entering the image signal into an electrically addressed spatial light modulator such as a liquid crystal television.

Among the known pattern recognition methods using the coordinate conversion is one which uses an ordinary VanderLugt type correlator to perform a preprocessing on the coordinate-converted image. FIG. 3 shows the configuration of the VenderLugt type correlator having the conventional coordinate conversion function. This method is described by referring to the drawing.

As the first step, a matched filter for the reference image is made. At this step, the reference image is displayed on the liquid crystal television 303. The coherent light emitted from the laser 301 is expanded by a beam expander 302 and then split into two beams by a beam splitter 305. One of the split beams passes through the liquid crystal television 303, which is showing the reference image, and the coordinate conversion optical filter 304 and is Fourier-transformed by the coordinate conversion lens 307 before striking the write plane of the liquid crystal light valve 308. In this way, the coordinate-converted intensity distribution image of the reference image is displayed on the liquid crystal light valve 308. The other of the beams split by the beam splitter 305 is reflected by a mirror 306, a beam splitter 309 and a polarizing beam splitter 310 and irradiates the read plane of the liquid crystal light valve 308 to transform the coordinate-converted intensity distribution image into a coherent image. The coherent image passes through the polarizing beam splitter 310 and is Fourier-transformed by a Fourier transform lens 311 before striking a photographic plate 312 as a signal light during the making of the hologram. At the same time, a light beam that has passed through the beam splitter 309 travels through a shutter 313, which is open, and is reflected by a mirror 314 to radiate onto the photographic plate 312 as a reference light during the making of the hologram. At this time, the signal light and the reference light strike the photographic plate 312 at specified angles to form a hologram on the photographic plate 312. The liquid crystal light valve 308 is located at the front focal plane of the Fourier transform lens 311 and the photographic plate 312 at the rear focal plane of the lens. The photographic plate 312 formed with the hologram is taken out and developed and then returned to the original position. The photographic plate 312 recorded and developed with the hologram is called a matched filter.

Next in the second step, the correlation processing is performed. Processing similar to the first step is omitted in the following description or only briefly explained. The second step displays the input image on the liquid crystal television 303. As in the first step, the coordinate-converted intensity distribution image is displayed on the liquid crystal light valve 308, is read out and Fourier-transformed by the Fourier transform lens 311 and then is radiated onto the photographic plate 312, a matched filter. Unlike the first step, the shutter 313 is closed so that the reference light does not strike the photographic plate 312. The light that has passed through the photographic plate 312 or the matched filter is Fourier-transformed again by the Fourier transform lens 315 so that a correlation peak representing the correlation coefficient of the reference image and the input image is produced on a light receiving element 316 located on the conversion plane of the lens. The photographic plate 312 is located on the front focal plane of the Fourier transform lens 315 and the light receiving element 316 on the rear focal plane of the lens.

With the above method, however, there are three problems that arise from the use of the photographic plate as a medium or a matched filter on which the hologram is recorded.

First, it is necessary to form a hologram on the photographic plate and then take the photographic plate out to develop it, requiring time and labor. Second, when the photographic plate, after being developed, is returned to the original position, it is very difficult and troublesome to adjust it exactly to the original position. In particular, the photographic plate must be so set that its light axis is aligned with the center of the hologram and that the plate is not rotated or warped. Third, when the reference image is to be changed, either a new matched filter must be made or the old filter be replaced with a prefabricated matched filter, making it impossible to change the reference image in real time or at high speed. For the reasons mentioned above, it has been impossible to form a pattern recognition apparatus which has a coordinate conversion function capable of a real-time operation in a useful level.

The use of the VanderLugt type correlator poses the following problem. The hologram formed on the photographic plate usually has a large angle of about several tens of degrees between the signal light and the reference light, so that the intervals between interference fringes are very narrow at about several hundred 1 p/mm. Therefore, the process of making the matched filter is easily affected by vibrations and wind. If the interference fringes should oscillate due to such influences, a precise hologram cannot be recorded, deteriorating the pattern recognition capability.

SUMMARY OF THE INVENTION

An object of this invention is to provide an optical pattern recognition apparatus which can perform an accurate pattern recognition operation even when the size and direction of an input object are changing.

Another object of the invention is to provide an optical pattern recognition apparatus which can easily change the kind of coordinate conversion and the reference image at high speed.

The optical pattern recognition apparatus according to this invention comprises:

an optical coordinate convertor unit for converting at least one reference image and at least one input image to be entered, from one coordinate system to a desired coordinate system to produce a coordinate-converted image; and a joint transform correlator for generating correlation coefficients between the coordinate-converted reference image and the coordinate-converted input image, both produced by the optical coordinate convertor;

the optical coordinate convertor comprising:

a means for producing a two-dimensional reference image and input image;

at least one coherent light source;

at least one object image spatial light modulator which holds the reference image and the input image;

at least one coordinate conversion optical filter placed closer to the object image spatial light modulator; and at least one lens;

the joint transform correlator comprising:

means for converting the coordinate-converted reference image and the coordinate-converted input image produced by the optical coordinate convertor into coordinate-converted intensity distribution images and then displaying the coordinate-converted intensity distribution images on a spatial light modulator for the coordinate-converted images;

means for converting the coordinate-converted intensity distribution images displayed on the coordinate-converted image spatial light modulator into coherent images;

means for converting the coherent image by using a lens for Fourier-transforming into a joint Fourier-transformed image of the coordinate-converted intensity distribution image;

means for converting the joint Fourier-transformed image into a Fourier-transformed intensity distribution image and displaying the Fourier-transformed intensity distribution image on a spatial light modulator for the Fourier-transformed image;

means for reading the Fourier-transformed intensity distribution image displayed on the Fourier-transformed image spatial light modulator by using coherent light;

means for converting a correlation output image, obtained by Fourier-transforming the Fourier-transformed intensity distribution image by using a lens, into a correlation signal by a photographing device or light receiving element; and means for processing the correlation signal to determine two-dimensional correlation coefficients of the reference image and the input image.

In the optical pattern recognition apparatus which has the above configuration and the coordinate conversion function, the input image and the reference image are optically converted by a coordinate conversion optical filter into a coordinate system where the correlation peak intensity becomes invariable for rotational and size changes. This assures pattern recognition with invariable performance for the object images that change in size and direction.

Since this invention is based on the joint transform correlator, not the VanderLugt type correlator, the change of the coordinate conversion optical filter to change the coordinate conversion kind or the replacement of the reference image can be done simply by changing the reference image or coordinate conversion optical filter. This eliminates the need for a series of steps including re-recording, developing and replacing the matched filter and then making the light axis adjustment, therefore ensuring a very easy and quick replacement or change of the filter and the reference image.

The light axis adjustment for the entire optical system of the pattern recognition apparatus is very easy when compared with the VanderLugt type correlator. Hence, the optical system is little affected by vibrations of the apparatus or movement of air.

BRIEF DESCRIPTION OF THE DRAWINGS

FIG. 3 is a schematic diagram showing the configuration of a conventional VanderLugt type correlator which has a coordinate conversion function;

FIG. 4 is one example of a method of displaying a reference image and an input image a distance apart on an electrically addressed spatial light modulator;

FIG. 5 is a cross section of a liquid crystal light valve of the invention using a ferroelectric liquid crystal;

FIG. 6 is an example of a waveform diagram showing the relationship between the reading laser output and the drive voltage applied to an optically addressed ferroelectric liquid crystal light valve, with (a) representing the drive voltage for an optically addressed spatial light modulator, (b) representing the output of a laser, (c) representing the drive voltage for an optically addressed spatial light modulator, and (d) representing the output of a laser;

FIG. 7 is a schematic diagram showing the configuration of another embodiment of the optical pattern recognition apparatus which has the coordinate conversion function;

FIG. 15 is a schematic diagram showing the configuration of one embodiment of an optical pattern recognition apparatus having the coordinate conversion function, in which an automatic light adjusting unit for the coordinate-converted image is added;

FIG. 16 is a schematic diagram showing the configuration of a further embodiment of the optical pattern recognition apparatus which has the coordinate conversion function;

FIG. 17 is a schematic diagram showing the configuration of a further embodiment of the optical pattern recognition apparatus which has the coordinate conversion function;

DETAILED DESCRIPTION OF THE PREFERRED EMBODIMENTS

Now, embodiments of the invention will be described by referring to the accompanying drawings.

Figure 1:
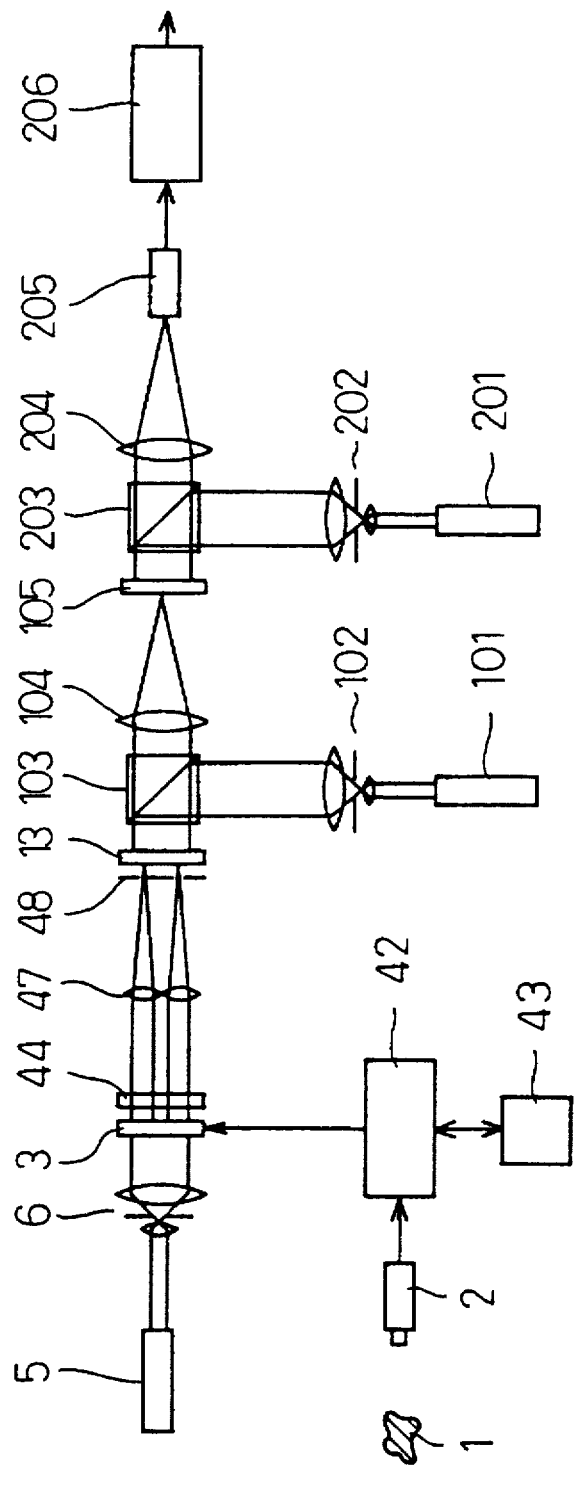
FIG. 1 is a schematic diagram showing the configuration of the optical pattern recognition apparatus, as one embodiment of this invention, which has a coordinate conversion function.
Figure 2:
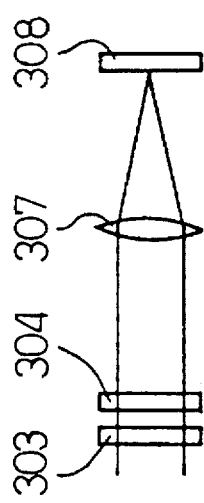
FIG. 2 is a schematic diagram showing the outline of the optical coordinate conversion method.

FIG. 1 shows the configuration of the optical pattern recognition apparatus, as one embodiment of the invention, which has a coordinate conversion function. An optical coordinate convertor has the following configuration: a means for producing a two-dimensional reference image and input image from an entered reference image and an entered input image. The entered reference image and the entered input image are oriented in an entered coordinate system. The optical coordinate converter consists of a first input image photographing device 2, a first image processing device 42 and an image memory device 43; at least one coherent light source consists of a first coordinate conversion laser 5 and a first coordinate conversion beam expander 6; and at least one object image spatial light modulator that holds the reference image and the input image is a first electrically addressed spatial light modulator 3 for input image; at least one coordinate conversion optical filter placed close to the object image spatial light modulator is a coordinate conversion optical filter array 44; and at least one lens is a coordinate conversion lens array 47. A joint transform correlator has the following configuration: a means for converting into coordinate-converted intensity distribution images the coordinate-converted images of the reference image and the input image obtained in the optical coordinate convertor, consists of a mask 48 and a first electrically addressed spatial light modulator for coordinate conversion; a means for converting the coordinate-converted intensity distribution images displayed on the coordinate-converted image spatial light modulator into coherent images consists of a Fourier transform laser 101, a Fourier transform beam expander 102, and a first Fourier transform polarizing beam splitter 103; a means for Fourier-transforming the coherent images by using a lens and producing a joint Fourier-transformed image of the coordinate-converted intensity distribution images consists of a first Fourier transform lens 104; a means for converting the joint Fourier-transformed image into a Fourier-transformed intensity distribution image and displaying the Fourier-transformed intensity distribution image on a Fourier-transformed image spatial light modulator consists of a light-addressed spatial light modulator 105 for Fourier-transformed image; a means for reading by the coherent light the Fourier-transformed intensity distribution image displayed on the Fourier-transformed image spatial light modulator consists of a correlation laser beam 201, a correlation beam expander 202 and a correlation polarizing beam splitter 203; a means for Fourier-transforming again the Fourier-transformed intensity distribution image thus read out by using a lens to produce a correlation output image and then converting the correlation output image into a correlation signal by using a photographing device or a light receiving element, consists of a second Fourier transform lens 204 and a light receiving element 205; and a means for processing the correlation signal to determine two-dimensional correlation coefficients of the reference image and the input image consists of an identification circuit 206.

First, the reference object, database of a reference for pattern recognition, is placed at a position of an input object 1 and photographed by a photographing device 2 to produce a two-dimensional reference image. The two-dimensional reference image is then stored via an image processor 42 into an image memory device 43. Likewise, an input object 1, which is to be identified, is photographed by the photographing device 2 to produce a two-dimensional input image. The input image and the reference image, the latter being stored in the image memory device 43, are synthesized by the image processor 42 and displayed on an electrically addressed spatial light modulator 3. The reference image and the input image are displayed a certain distance L apart so that they do not overlap, as shown in FIG. 4.

An optical filter array 44 consists of two coordinate conversion optical filters, both made by a computer generated hologram, arranged a specified distance L apart. In the coordinate conversion process, if images to be converted are not in the same positional relationship with respect to the coordinate conversion optical filter, the conversion will produce different coordinate-converted images even when the same image is coordinate-converted. For this reason, the distance between the two coordinate conversion optical filters must be equal to the distance L between the reference image and the input image so that the relative positional relation of the reference image with the coordinate conversion optical filter will be equal to the relative positional relation of the input image with the coordinate conversion optical filter.

The coherent light emitted from the laser 5 is expanded by a beam expander 6 into a parallel-ray beam of a specified diameter and then radiated onto the electrically addressed spatial light modulator 3 on which the input image and the reference image are displayed. Then, these images are converted into coherent images. The coherent images pass through optical filters on the optical filter array 44 put close to the electrically addressed spatial light modulator 3 and are then Fourier-transformed by respective coordinate conversion lenses on a lens array 47. As a result, coordinate-converted images that are converted into a desired coordinate system are formed on the Fourier transfer plane. A mask 48 placed immediately before the light-addressed spatial light modulator 13 is formed with holes to allow only the + first order coordinate-converted images to pass through. This cuts off unwanted dc bias components and high-order coordinate-converted images and only the necessary coordinate-converted images of the reference and input images pass through the mask to radiate onto the write plane of the light-addressed spatial light modulator 13. The coordinate-converted input and reference images are converted into coordinate-converted intensity distribution images, which are displayed a distance L apart on the light-addressed spatial light modulator 13. There are many kinds of light-addressed spatial light modulators 13. In this embodiment, the light-addressed spatial light modulator employs a reflection type liquid crystal light valve which uses a ferroelectric liquid crystal as the light modulating material.

On the front focal plane of the lens array 47 are located an electrically addressed spatial light modulator 3 and an optical filter array 44, both arranged close together. On the rear focal plane is positioned an electrically addressed spatial light modulator 13. The coordinate conversion lenses, as with the coordinate conversion optical filters, are arranged a distance L apart at positions that correspond to the two images being converted.

The coherent light emitted from the laser 101 is expanded by a beam expander 102 into a parallel-ray beam of a specified diameter and then reflected by a polarizing beam splitter 103 to radiate onto the read plane of the light-addressed spatial light modulator 13 as the reading light. The light-addressed spatial light modulator 13 and its operation will be described in detail. The polarizing direction of the reading light is aligned beforehand with the alignment direction of the liquid crystal molecules (or aligned with a direction perpendicular to it), in which direction the liquid crystal molecules are aligned by initialization of the spatial light modulator. By passing the reading light—which was reflected by the light-addressed spatial light modulator 13—through a detector whose polarizing axis is set perpendicular or parallel to the polarization direction of the reading light, the image displayed on the light-addressed spatial light modulator 13 can be read out as a positive image or a negative image. In this embodiment, a polarizing beam splitter 103 is used as a detector.

In this way, the coordinate-converted intensity distribution image is converted into a coherent image and then Fourier-transformed by the lens 104 into a joint Fourier-converted image—which represents the coordinate-converted intensity distribution image for the reference image and the input image—on the Fourier transfer plane. On the Fourier transfer plane is placed the write plane of a light-addressed spatial light modulator 105, on which the intensity distribution of the joint Fourier-transformed image consisting of each coordinate-converted intensity distribution image for the reference and input image is displayed as the Fourier-transformed intensity distribution image on the light-addressed spatial light modulator 105. In this embodiment, too, a reflection type liquid crystal light valve using a ferroelectric liquid crystal is used as the light-addressed spatial light modulator 105 as with the light-addressed spatial light modulator 13. The light-addressed spatial light modulator 13 is located at the front focal plane of the lens 104 while the light-addressed spatial light modulator 105 is positioned at the rear focal plane.

The coherent light emitted from the laser 201 is expanded by a beam expander 202 into a parallel-ray beam of a specified diameter and then reflected by a polarizing beam splitter 203 to radiate onto the read plane of the light-addressed spatial light modulator 105 as the reading light. In this case, too, as with the light-addressed spatial light modulator 13, the Fourier-transformed intensity distribution image displayed on the light-addressed spatial light modulator 105 is converted into a coherent image. The detector, however, employs a polarizing beam splitter 203. The coherent image thus read out is Fourier-transformed by the lens 204 to form a correlation output image including a correlation peak on a light receiving element 205 located on the Fourier-transfer plane. The light receiving element 205 picks up only the correlation peak in the correlation output image and converts it into a correlation signal. The correlation signal is entered into an identification circuit 206 which measures the correlation peak intensity to produce correlation coefficients of the input image and the reference image. The light-addressed spatial light modulator 105 is located at the front focal plane of the lens 204 while the light receiving element 205 is positioned at the rear focal plane.

For strict Fourier transform, it is preferred that the image to be Fourier-transformed be put on the front focal plane of each Fourier transform lens or between the lens and its rear focal plane. Then the Fourier-transformed image is formed on the rear focal plane of the lens. In this embodiment, therefore, the image is placed on the front focal plane of the lens array 47, lens 104 and lens 204 and the Fourier-transformed image is received on the rear focal plane.

In this embodiment, the reflection type liquid crystal light valve using the ferroelectric liquid crystal is used as the light-addressed spatial light modulators 13, 105. When the TN liquid crystal, a well-known light modulating material, is used, the gradation display can be made but there are drawbacks such as a low resolution at about 30 lp/mm and a slow operation speed at the video rate of around 30 Hz. To solve this problem, this embodiment uses a ferroelectric liquid crystal rather than the TN liquid crystal as the light modulating material. The liquid crystal light valve using the ferroelectric liquid crystal has the resolution of about 100 lp/mm and the operation speed of around several kHz, which are excellent characteristics. What should be noted here, however, is that the liquid crystal light valve using the ferroelectric liquid crystal has a bistability and therefore stores the write image in a binary state or digitally stores it. Since in this embodiment, the coordinate-converted intensity distribution image and Fourier-transformed intensity distribution image are binarized and stored, they are a binarized coordinate-converted intensity distribution image and a binarized Fourier-transformed intensity distribution image. Possible light modulating materials other than the liquid crystal may include electro-optical crystals such as BSO crystals. It is also noted that a transmission type light-addressed spatial light modulator works on the same principle as the reflection type. Rather than using the light-addressed spatial light modulator, it is also possible to use a combination of a photographing device and a light-addressed spatial light modulator. This method will be described later in detail.

Next, we will explain about the construction and operation of the reflection type liquid crystal light valve, used as the light-addressed spatial light modulator in this embodiment, which employs a ferroelectric liquid crystal as the light modulating material. What differs from the conventional liquid crystal light valve is the use as the liquid crystal layer of the ferroelectric liquid crystal that has a definite bistability between the light transmission factor or light reflection factor and the applied voltage. FIG. 5 shows the cross section of the liquid crystal light valve using the ferroelectric liquid crystal. Transparent substrates 131a, 131b such as glass and plastics that sandwich crystal molecules are provided at the surfaces with transparent electrodes 132a, 132b and alignment layers 133a, 133b, the alignment layers being oblique-evaporated evaporated with silicon monoxide in the range of 75 to 85 degrees from the direction normal to the transparent substrate. The transparent substrates 131a, 131b contain between them a ferroelectric liquid crystal layer 134, with their alignment layer 133a, 133b sides facing each other to control a gap located therebetween in which spacers 139 are installed. Between the transparent electrode 132a and the alignment layer 133a on the optical writing side is formed a photoconductive layer 135, a light shielding layer 136 and a dielectric mirror 137 put close together. The cell outer surfaces of the writing side transparent substrate 131a and the reading side transparent substrate 131b are formed with anti-reflection coatings 138a, 138b.

In the above structure, when the visible light reflection factor of the dielectric mirror 137 is sufficiently large and there is very little effect of the reading light on the photoconductive layer 135, the light shielding layer 136 may be omitted. Further, when the reflection factor of the photoconductive layer 135 for the reading light is sufficiently large and the reading light has a sufficiently small intensity and has very little effect on the photoconductive layer 135, the dielectric mirror 137 can also be eliminated. In this embodiment, however, since the normal coordinate-converted intensity distribution image has a small area and the utilization of the reading light is low, the reading light should preferably be strong. For this reason, the light-addressed spatial light modulator 13 that displays the coordinate-converted intensity distribution image should preferably have the light shielding layer 136 and the dielectric mirror 137. Conversely, since the Fourier-transformed intensity distribution image has a not-so-small area, the reading light may be weak. Thus, the light-addressed spatial light modulator 105 that displays the Fourier-transformed intensity distribution image may not necessarily incorporate the light shielding layer 136 and the dielectric mirror 137.

Next, the method of initializing the liquid crystal light valve with the above construction will be described. The first method involves irradiating with light the entire write plane of the liquid crystal light valve, applying between the transparent electrodes 132a and 132b a pulse voltage or dc bias voltage sufficiently higher than a lighted-state threshold voltage or a dc bias voltage superimposed with 100 Hz–50 kHz ac voltage to align the ferroelectric crystal molecules in one stable direction, and then storing this condition in memory. The second method consists of applying between the transparent electrodes 132a and 132b a pulse voltage or dc bias voltage sufficiently higher than a dark-state threshold voltage or a dc bias voltage superimposed with 100 Hz–50 kHz ac voltage to align the ferroelectric liquid crystal in one stable direction, and then storing that condition in memory. Normally, the dark-state threshold voltage is higher than the lighted-state threshold voltage.

Now, the operation after the liquid crystal light valve is initialized as mentioned above will be explained. A picture is written with a laser beam while the transparent electrodes 132a and 132b are impressed with a pulse voltage or dc bias voltage, or a dc bias voltage superimposed with 100 Hz–50 kHz ac voltage, whose polarity is reversed to that when the initialization is performed and whose magnitude is lower than the dark-state threshold voltage and higher than the lighted-state threshold voltage. The area of the photoconductive layer 135 struck by the laser beam produces carriers, which are drifted in the direction of an electric field by the applied voltage, causing a drop in the threshold voltage. This in turn applies to the laser-irradiated area a voltage whose polarity is reverse to that of the voltage when the initialization was performed and whose magnitude is higher than the threshold voltage. The applied voltage causes the ferroelectric liquid crystal to reverse its molecules into another stable state as a result of spontaneous polarizing, binarizing and storing the image in memory.

The binarized and stored image can be read out in a positive or negative state by radiating a linearly polarized reading light whose polarizing axis is arranged in the direction of alignment of the initialized crystal molecules (or in a direction perpendicular to it) and by passing the reflected light from the dielectric mirror 137 through a light detector, whose polarizing axis is perpendicular (or parallel) to the polarizing direction of the reflected light. In the embodiment of FIG. 1, a polarizing beam splitter is used instead of the detector.

The threshold value for binarizing the image can be changed by adjusting the magnitude and width of the pulse voltage or the frequency of ac voltage, or the magnitude of dc bias voltage, all applied between the transparent electrodes 132a, 132b. Also by adjusting the power of the laser to change the intensity of light irradiated against the write plane, it is possible to produce virtually the same effect as when the threshold value is changed.

Next, the method of driving at high speed the liquid crystal light valve that uses the ferroelectric liquid crystal as the light-addressed spatial light modulator 13, 105 will be described. From the operating principle and the initialization procedure, the liquid crystal light valve must be driven as follows. Basically, the writing light radiation time during which the writing light is radiated onto the write plane of the liquid crystal light valve must overlap the write voltage application time for the liquid crystal light valve for at least a specified period of time. Where there are a number of liquid crystal light valves connected in series, the drive voltage applied to respective liquid crystal light valves must be synchronized with the irradiation timing of the reading and writing light on the liquid crystal light valves.

FIG. 6 shows one example of the relationship between the drive voltage applied to the light-addressed spatial light modulators 13, 105 and the output light intensity of the laser 101 and laser 201 that write on the light-addressed spatial light modulators. The process of writing the coordinate-converted images of the input and reference images onto the light-addressed spatial light modulator 13 will be described later. Here let us suppose that these coordinate-converted images are radiated onto the write plane of the light-addressed spatial light modulator 13 at all times when the write pulse is applied to the spatial light modulator 13. First, as shown in FIG. 6(a), the light-addressed spatial light modulator 13 is impressed with a drive voltage which consists of an erase pulse 150, a write pulse 151 and a zero voltage 152, these appearing repetitively in that order. The image stored in the light-addressed spatial light modulator 13 is initialized and erased when applied with the erase pulse 150; an image being radiated onto the write plane is newly stored when applied with a write pulse 151; and the recorded image is read out during the zero voltage 152. This process is repeated. The erase pulse 150 and write pulse 151 are the pulse voltages that satisfy the conditions described in the explanation of the operating principle.

With the above drive voltage applied, the light-addressed spatial light modulator 13 is recorded with new binarized coordinate-converted intensity distribution images one after another. As shown in FIG. 6(b), the output of the laser 101 is modulated so that the laser irradiation 153 during which the reading light is radiated onto the read plane of the light-addressed spatial light modulator 13 matches the zero voltage state 152 of the drive voltage applied to the light-addressed spatial light modulator 13. This causes the new binarized coordinate-converted intensity distribution images stored in the light-addressed spatial light modulator 13 to be read out successively and the joint Fourier-transformed images are radiated onto the write plane of the light-addressed spatial light modulator 105 for the duration of the laser irradiation 153 by the laser 101. Then, as shown in FIG. 6(c), the light-addressed spatial light modulator 105 is applied with the write pulse 155 in synchronism with the laser irradiation period 153. Immediately before applying the write pulse 155, the erase pulse 154 is applied to initialize the light-addressed spatial light modulator 105. Immediately after the write pulse 155, there is a state of zero voltage 156, allowing the image to be read out. With the above process performed, the light-addressed spatial light modulator 105 is recorded successively with new binarized Fourier-transformed intensity distribution images. The recorded binarized Fourier-transformed intensity distribution images are read out as the correlation output images during the irradiation 157 of the laser 201, by synchronizing the zero voltage state 156 with the laser irradiation period 157, as shown in FIG. 6(d).

If the light-addressed spatial light modulators 13, 105 do not have the light shielding layer 136 and the dielectric mirror 137, the reading light influences the photoconductive layer 135. Making use of this fact, it is possible to lower the applied voltage of the erase pulse 150, 154. That is, if the reading light is irradiated not only during the period corresponding to the zero voltage 152, 156 but continues to be irradiated also during the period corresponding to the erase pulse 150, 154, the laser light is kept radiated also during the initialization. Since the threshold voltages for the light-addressed spatial light modulators 13, 105 are lower during the illuminated state than during the dark state, the initialization can be performed even when the voltage level of the erase pulse 150, 154 is lowered.

If the light-addressed spatial light modulators have the light shielding layer 136 and the dielectric mirror 137 so that the effect of the reading light on the photoconductive layer 135 can be ignored, the modulation of the reading light as mentioned above is not necessary. In that case, it is still necessary to synchronize the zero voltage period 152 for the light-addressed spatial light modulator 13 with the write pulse 155 for the light-addressed spatial light modulator 105.

By applying the above-mentioned drive voltage, it is found that the light-addressed spatial light modulators 13, 105 can be operated at a high speed of 30 Hz to 2 kHz. Since the image radiated onto the write plane is recorded in binary form, it is possible to produce a precise image with little noise by adjusting the threshold level even when there are noise components so large as will otherwise mutilate the image.

Next, we will explain about the electrically addressed spatial light modulator 3 used in the above embodiment. As mentioned above, when the liquid crystal light valve, which employs a ferroelectric liquid crystal as the light-addressed spatial light modulators 13, 105, is used, operation at a very high speed of 30 Hz–2 kHz becomes possible. However, when the liquid crystal television whose light modulating material is TN liquid crystal is used as the electrically addressed spatial light modulator 3, the operation is only possible at a slow speed of around 30 Hz. In that case, the operation speed of the pattern recognition apparatus of this invention is restricted by the speed of the electrically addressed spatial light modulator 3. For increasing the operation speed of the electrically addressed spatial light modulator 3, it is preferable to use such light modulating materials as electro-optical ceramics like PLZT, magneto-optical materials like yttrium iron garnet and ferroelectric liquid crystal. This embodiment therefore uses the electrically addressed spatial light modulator 3 that uses the ferroelectric liquid crystal as the light modulating material.

For the operation of the electrically addressed spatial light modulator 3, it is of course necessary to synchronize it with the operation of other spatial light modulator and lasers, as with the light-addressed spatial light modulators 13, 105. That is, to record the coordinate-converted images of the reference image and input image displayed on the electrically addressed spatial light modulator 3 onto the light-addressed spatial light modulator 13, it is necessary to erase the image and write a new image on the electrically addressed spatial light modulator 3 during the zero voltage 152 and the erase pulse 150 of the drive voltage applied to the light-addressed spatial light modulator 13 and to hold the image displayed on the electrically addressed spatial light modulator 3 while the write pulse 151 is applied. The method of driving each pixel on the electrically addressed spatial light modulator 3 employs an active system as represented by a TFT (thin film transistor) system in which a transistor is formed for each pixel and particular transistors are activated. The moment the zero voltage period 152 starts, a signal for erasing the image represented by the pixels on the electrically addressed spatial light modulator 3 is applied, immediately followed by the application of image signals to each pixel to display a new image. In this way, the electrically addressed spatial light modulator 3 can be operated at a high speed in synchronism with other spatial light modulators.

In normal correlation processing that does not use coordinate conversion, when the input object is rotated about 10 degrees with respect to the reference object or is 20–30% different in size, the correlation peak intensity greatly decreases, making the precise recognition difficult. With this invention, the coordinate conversion optical filter is used, which converts the image into the (lnr, θ) coordinate system. This filter enables the input image to be identified for the rotating angle of up to 360 degrees and the size change of up to 50%, assuring invariable pattern recognition for input images having rotation and size changes. It is also possible to determine the rotating angle and the size change based on the position where the correlation peak appears. Furthermore, where a coordinate conversion optical filter is used which converts an image into another coordinate system, this invention permits an invariable pattern recognition for the coordinate-converted images having rotation and size changes.

As to the recognition speed, when the spatial light modulator is used which employs a ferroelectric liquid crystal as the light modulating material and which can operate at 30 Hz–2 kHz, the pattern recognition apparatus can operate at a high speed of around 30 Hz–20 kHz.

Furthermore, since this invention employs a joint transform type correlator rather than a VanderLugt type, there is no need for developing the photographic plate or setting it after development, making the pattern recognition process simple. If reference objects are stored in the image memory device 43 beforehand, it is possible to change the reference object easily and quickly. Because this invention does not require a spatial light modulator with such high resolution as required by the photographic plate, there is little effect of apparatus vibration and air movement on the display and the light axis of the optical system can easily be adjusted.

FIG. 7 shows the configuration of other embodiment of the optical pattern recognition apparatus having the coordinate conversion function. Constitutional elements having the identical functions with those of the embodiment of FIG. 1 are assigned like reference numerals and their explanations are omitted or only brief explanations provided. The optical coordinate convertor has the same configuration with that of the previous embodiment. The points in which the joint transform correlator differs from the previous embodiment include the following. A means for converting into coordinate-converted intensity distribution images the coordinate-converted images of the reference image and the input image obtained in the optical coordinate convertor and for displaying the coordinate-converted intensity distribution images on the coordinate-converted image spatial light modulator consists of a photographing device 9, a mask 48 and an electrically addressed spatial light modulator. A means for converting the joint Fourier-transformed image into a Fourier-transformed intensity distribution image and displaying the Fourier-transformed intensity distribution image on a spatial light modulator consists of a photographing device 106 and an electrically addressed spatial light modulator 107.

The procedure up to the step of producing the coordinate-converted images of the input image and reference image on the Fourier transfer plane is the same as that shown in the embodiment of FIG. 1 and its explanation is omitted here. The coordinate-converted images produced on the Fourier transfer plane are received by the photographing device 9 where they are converted into electric signals. The electric signals are supplied to the electrically addressed spatial light modulator 14, which then displays the coordinate-converted intensity distribution images a specified distance L apart. The coherent light emitted from the laser 101 is expanded by the beam expander 102 and radiated onto the electrically addressed spatial light modulator 14 to transform the coordinate-converted intensity distribution images into coherent images. These coherent images are Fourier-transformed by the lens 104 to form a joint Fourier-transformed image on the Fourier transfer plane. The joint Fourier-transformed image is received by the photographing device 106 where it is converted into electric signals. The electric signals are then fed to the electrically addressed spatial light modulator 107 to display a Fourier-transformed intensity distribution image of the joint Fourier-transformed image on the electrically addressed spatial light modulator 107. The coherent light emitted from the laser 201 is expanded by the beam expander 202 and radiated onto the electrically addressed spatial light modulator 107 to transform the Fourier-transformed intensity distribution image into a coherent image, which is further Fourier-transformed by the lens 204 to produce a correlation output image on the Fourier transfer plane of the lens. The processing after this is similar to that of the previous embodiment and its explanation omitted.

For increasing the operation speed of the electrically addressed spatial light modulators 14, 107 for coordinate conversion and the Fourier conversion, it is preferable to use such light modulating materials as electro-optical ceramics like PLZT, magneto-optical. materials like yttrium iron garnet and ferroelectric liquid crystal, as with the electrically addressed spatial light modulator 3 of the previous embodiment. This embodiment therefore uses the electrically addressed spatial light modulators 14, 107 that uses the ferroelectric liquid crystal as the light modulating material. Since the ferroelectric liquid crystal has a bistability, the image displayed is usually binarized. Hence, the coordinate-converted intensity distribution image and Fourier-transformed intensity distribution image are displayed as a binarized coordinate-converted intensity distribution image and a binarized Fourier-transformed intensity distribution image.

When electrically addressed spatial light modulators using the ferroelectric liquid crystal as the light modulating material are used for the electrically addressed spatial light modulators 14, 107, the electric signals output from the photographing devices 9, 106 need only be input as is to produce the binarized coordinate-converted intensity distribution image and binarized Fourier-transformed intensity distribution image. However, where normal electrically addressed spatial light modulators are employed, the electric signals must be binarized before being supplied to these electrically addressed spatial light modulators since they display images in a graded tone.

This embodiment, too, can perform the invariable pattern recognition at a high speed for input images having rotational and size changes.

Figure 8:
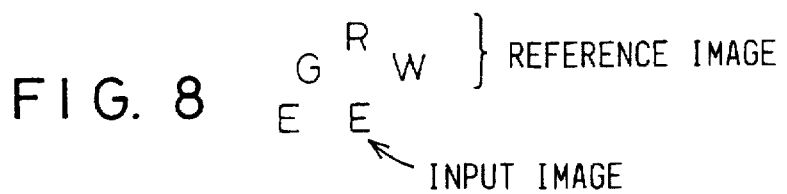
FIG. 8 is an example of an arrangement of input images and a plurality of reference images.

In the preceding embodiments, there are only one reference image and one input image. When a number of images are to be identified, the reference images must be replaced one after another, requiring time for pattern recognition. To solve this problem, a plurality of reference images are provided so that the correlation processing with many reference images can be done at a time. FIG. 8 shows one example arrangement of an input image and a plurality of reference images. A plurality of reference images are arranged in a circle with the input image at the center. The coordinate conversion optical filter in the optical filter array 44, the coordinate conversion lens in the lens array 47 and the holes in the mask 48 are arranged in positions corresponding to the reference image and the input image. This arrangement permits pattern recognition similar to the one performed in the above embodiments. It is noted here that since the plural number of reference images produces multiple pairs of correlation peaks, the corresponding number of light receiving elements 205 must be arranged at positions where the respective correlation peaks appear. While in the above description the reference image is provided in plural numbers, the same effect can be obtained by using a plurality of input images and a single reference image. The following description takes a case of multiple reference images for example.

When multiple reference images are used, the correlation peak intensities decrease and noise increases, substantially lowering the S/N ratio. To eliminate this drawback, the inventors are proposing a joint transform correlator having a feedback system. This is a common joint transform correlator added with a feedback system. The feedback system supplies to a linear or nonlinear transfer function two-dimensional correlation coefficients of at least one input image and at least one reference image, obtained by the correlation processing, and thereby virtually changes the intensity of light passing through the reference images, which correspond to the correlation coefficients, according to the output of the transfer function. With this configuration, the pattern recognition with a good S/N ratio is possible even when a plurality of reference images are used.

Figure 9:
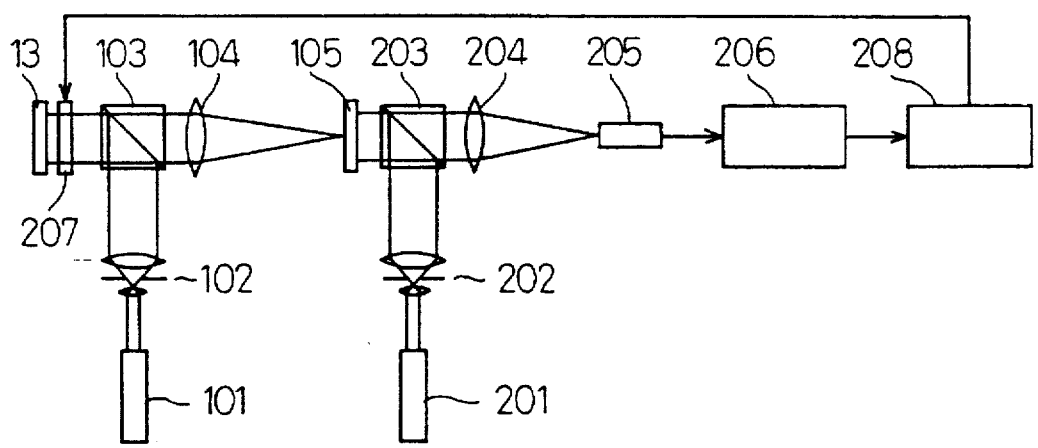
FIG. 9 is a schematic diagram showing the configuration of one embodiment in which a feedback system is added to the optical pattern recognition apparatus of the invention having the coordinate conversion function.

In this invention, it is possible to add the above-mentioned feedback system. FIG. 9 shows one example of an embodiment in which the feedback system is added to the optical pattern recognition apparatus having the coordinate conversion function. The feedback section has the following configuration. A normalizing circuit for normalizing the correlation coefficients with the maximum correlation coefficient consists of a feedback control circuit 208. A mask spatial light modulator placed immediately before or after the object image spatial light modulator or the coordinate-converted image spatial light modulator is a feedback mask 207. A means for changing the transmission factor or reflection factor for the corresponding portion of each reference image or each coordinate-converted intensity distribution image on the mask spatial light modulator in a linear or nonlinear relationship with the correlation coefficients normalized by the normalizing circuit, consists of a feedback control circuit 208. The points in which this embodiment differs from the one of FIG. 1 are that since multiple reference images are provided, the corresponding coordinate conversion optical filter, coordinate conversion lens and the light receiving element have increased in number; that the feedback mask 207 to change the intensity of the reading light irradiating the binarized coordinate-converted intensity distribution images is located immediately behind the light-addressed spatial light modulator 13 that records and displays the binarized coordinate-converted intensity distribution images; and that the feedback control circuit 208 is provided to control the feedback mask 207 according to the correlation coefficients from the identification circuit 206.

Next, the actual operation will be explained. The process of recording a plurality of binarized coordinate-converted intensity distribution images on the light-addressed spatial light modulator 13 has already been described and is not given here. The coherent light emitted from the laser 101, as in the case of FIG. 1, is reflected by the polarizing beam splitter 103 and passes as the reading light through the feedback mask 207 to radiate onto the read plane of the light-addressed spatial light modulator 13. In the initialized state, the feedback mask 207 is in a total transmissive state. The reflected light from the read plane passes again through the feedback mask 207 and then through the polarizing beam splitter 103. The light is then Fourier-transformed by the lens 104 to form a joint Fourier-transformed image on the light-addressed spatial light modulator 105 which memorizes the binarized Fourier-transformed intensity distribution image. It should be noted here that the reading light passes through the feedback mask 207 two times. That is, if the transmission factor of the feedback mask 207 is set at x, the binarized coordinate-converted intensity distribution image is equivalently masked by $x^2$. The process for reading the stored binarized Fourier-transformed intensity distribution image to produce the correlation coefficients is the same as shown in FIG. 1, and its explanation is omitted. It is noted, however, that a plurality of correlation coefficients are sent from the identification circuit 206 to the feedback control circuit 208.

The correlation coefficients corresponding to the reference images entered into the feedback control circuit 208 is normalized with the maximum correlation coefficient and then supplied to the feedback transfer function, which is preset beforehand or changed according to the result of the correlation processing, to determine the masking ratios for the reference images. According to the ratios, the transmission factor of a part of the feedback mask 207 corresponding to the binarized coordinate-converted intensity distribution image of each reference image is changed. The transmission factor of course takes into consideration the fact that the light passes through the feedback mask 207 two times. In this condition, the similar correlation processing is repeated in the feedback loop. This feedback permits pattern recognition with a good S/N ratio even when the reference image used is plural in number. While in the above example, the feedback mask 207 is used to change the intensity of light irradiating the binarized coordinate-converted intensity distribution images, it is also possible to locate the feedback mask immediately before or after the electrically addressed spatial light modulator 3 to change the intensity of light irradiating the original reference images.

Various feedback transfer functions may be used. As linear or non-linear functions, there may be saturation type functions, such as step functions and sigmoid functions, or the combination of both. By changing the kind and shape of the feedback transfer function such as nonlinearity and threshold value, the recognition capability of this pattern recognition apparatus of the invention is greatly changed. Hence, presetting an appropriate feedback transfer function or changing the shape or kind of the feedback transfer function according to the result of the correlation processing permits the pattern recognition at a higher speed and an improved S/N ratio.

The areas of the reference image and input image themselves or the areas of the coordinate-converted intensity distribution images of these reference and input images can be normalized by using the feedback mask 207 or other optical mask. When many reference images are used, there are different areas of reference images and input images or of their coordinate-converted intensity distribution images, so that a problem arises that in the images with larger areas become easier to identify. For this reason, instead of the image areas, the quantities of light passing through or being reflected by the feedback mask are measured. Based on the measured values, the feedback mask 207 and other optical mask are controlled to change the intensity of light passing through or reflected by the mask which virtually represents the reference image and input image or their coordinate-converted intensity distribution images. This makes equal the intensities of Fourier-transformed images of the coordinate-converted intensity distribution images. The normalizing is equivalent to making equal the intensities of the self correlation peaks of the reference images, and it is verified that the recognition capability using multiple reference images has improved whether the system has a feedback system or not.

Figure 10:
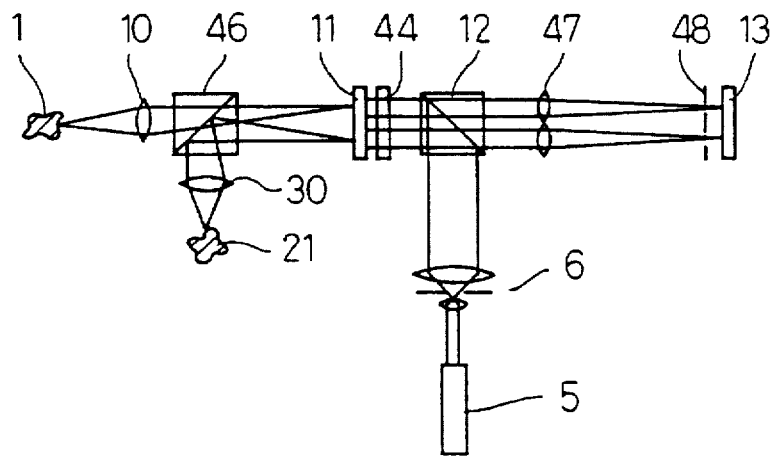
FIG. 10 is a schematic diagram showing the configuration of a further embodiment of the optical pattern recognition apparatus which has the coordinate conversion function.

FIG. 10 shows the configuration of another embodiment of the optical pattern recognition apparatus, according to this invention, which has the coordinate conversion function. This represents a system in which the input image and the reference image are displayed on a single light-addressed spatial light modulator. Components having identical functions with those of the embodiment in FIG. 1 are assigned like reference numerals, and their explanation is omitted or simplified. The processing performed after the coordinate-converted intensity distribution images are displayed on the light-addressed spatial light modulator 13 is the same as that already mentioned and its explanation is omitted. The points in which the optical coordinate convertor of this embodiment differs from the embodiment of FIG. 1 are that the means for producing the two-dimensional reference image and input image consists of lenses 10, 30 and a beam splitter 46 and that at least one object image spatial light modulator that holds the reference image and the input image is a light-addressed spatial light modulator 11.

The image of an input object 1 is focused by the lens 10 and beam splitter 46 onto the write plane of the light-addressed spatial light modulator 11 and is displayed as an input image on the modulator 11. Similarly, the image of a reference object 21 is focused by the lens 30 and beam splitter 46 onto the write plane of the light-addressed spatial light modulator 11 and is displayed as a reference image on the modulator 11. The optical system is already adjusted so that the input image and the reference image are formed a specified distance L apart. The configuration of the light-addressed spatial light modulator 11, which uses a reflection type liquid crystal light valve, will be described.

The coherent light emitted from the laser 5 is expanded by the beam expander 6 and reflected by the polarizing beam splitter 12 and passes through the optical filter array 44 to irradiate the write plane of the light-addressed spatial light modulator 11, thereby converting the input image and the reference image into coherent images. The optical filter array 44 and the light-addressed spatial light modulator 11 are arranged close together. The coherent images then pass through the optical filter array 44 and the polarizing beam splitter 12 and are Fourier-transformed by the lens array 47, forming the coordinate-converted intensity distribution images on the light-addressed spatial light modulator 13. The processing after this is the same as that mentioned in the previous embodiment and hence its explanation omitted.

Figure 11:
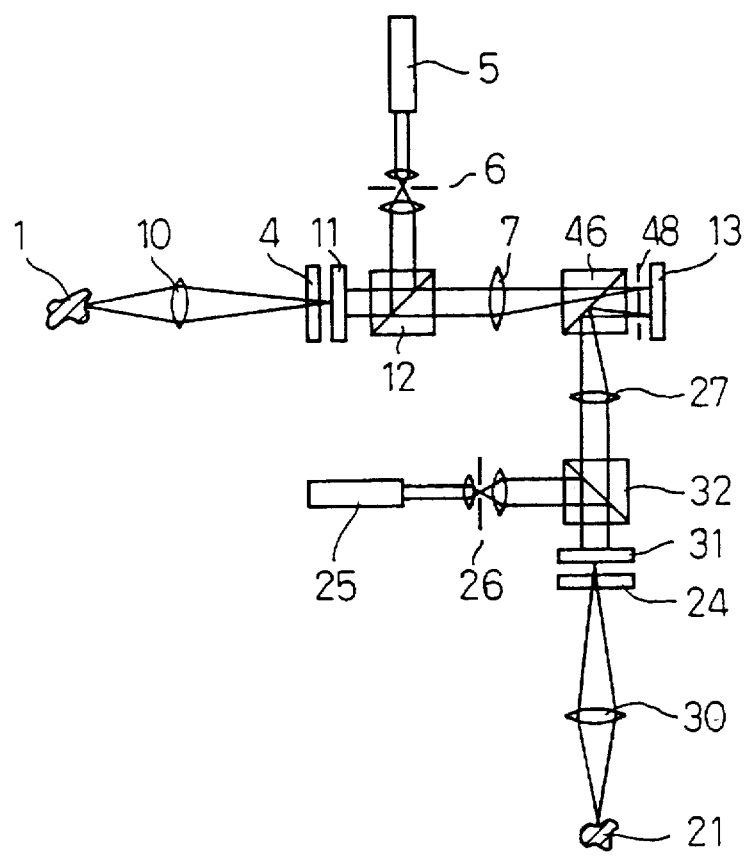
FIG. 11 is a schematic diagram showing the configuration of a further embodiment of the optical pattern recognition apparatus which has the coordinate conversion function.

FIG. 11 shows the configuration of a further embodiment of the optical pattern recognition apparatus, according to this invention, which has the coordinate conversion function. This represents the method in which the reference image and the input image are displayed on separate light-addressed spatial light modulators so that they are coordinate-converted separately. Components having identical functions with those of the embodiment in FIG. 1 are assigned like reference numerals, and their explanation is omitted or simplified. The processing performed after the coordinate-converted intensity distribution images are displayed on the light-addressed spatial light modulator 13 is the same as that already mentioned and its explanation omitted. The points in which the optical coordinate convertor of this embodiment differs from the embodiment of FIG. 1 are that the means for producing the two-dimensional reference image and input image consists of lenses 10, 30; that at least one coherent light source consists of the laser 5, beam expander 6, polarizing beam splitter 12, laser 25, beam expander 26 and polarizing beam splitter 32; that at least one object image spatial light modulator that holds the reference image and the input image is a light-addressed spatial light modulators 11, 31; at least one coordinate conversion optical filter put close to the object image spatial light modulator is optical filters 4, 24; and at least one lens is lenses 7, 27.

The image of an input object 1 is focused by the lens 10, through the optical filter 4 located immediately before the light-addressed spatial light modulator 11, onto the write plane of the light-addressed spatial light modulator 11 and is displayed on it as the input image. Similarly, the image of a reference object 21 is focused by the lens 30, through the optical filter 24 put immediately before the light-addressed spatial light modulator 31, onto the write plane of the light-addressed spatial light modulator 31 and is displayed on it as the reference image. The reference image and the input image are displayed on the light-addressed spatial light modulators 11, 31 as images superimposed with the coordinate conversion optical filter. When the input image and the reference image are to be displayed on the light-addressed spatial light modulators 11, 31, it is possible to display the coordinate conversion optical filter superimposed on these images or, as in the previous embodiment, to let the input image and the reference image pass through the coordinate conversion optical filter when reading the input and reference images.

The coherent beams emitted from the lasers 5, 25 are each expanded by the beam expanders 6, 26 and reflected by the polarizing beam splitters 12, 32 to irradiate the read plane of the light-addressed spatial light modulators 11, 31. As a result, the reference image and the input image are read out and converted into coherent images. The coherent images are Fourier-transformed by the lenses 7, 27, pass through the beam splitter 46 and are unwanted dc bias components are removed by the mask 48 and then only the coordinate-converted intensity distribution images are displayed a certain distance L apart on the light-addressed spatial light modulator 13. The processing performed after the coordinate-converted intensity distribution images are displayed on the light-addressed spatial light modulator 13 is the same as that of the previous embodiment and thus its explanation and drawings are omitted.

Figure 12:
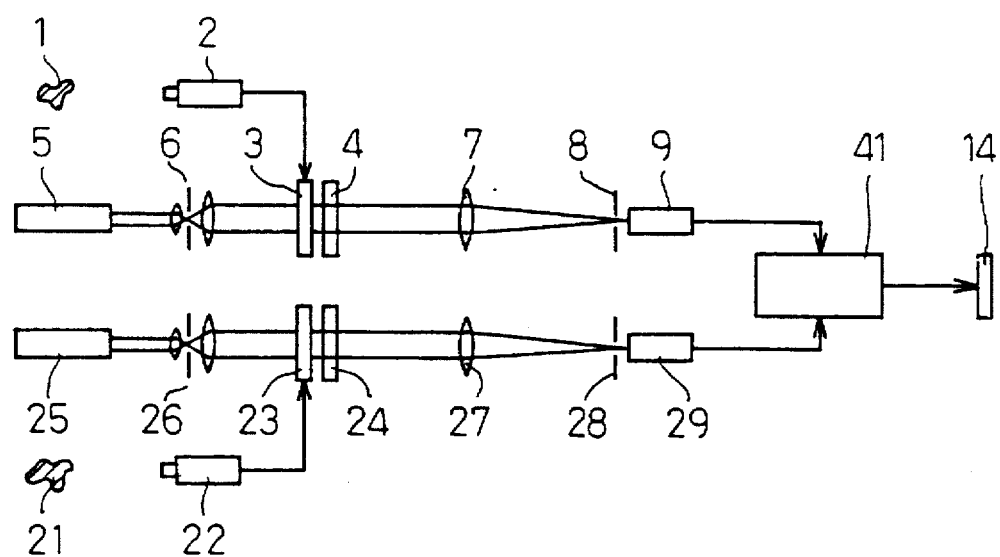
FIG. 12 is a schematic diagram showing the configuration of a further embodiment of the optical pattern recognition apparatus which has the coordinate conversion function.

FIG. 12 shows the configuration of a further embodiment of the optical pattern recognition apparatus, according to this invention, which has the coordinate conversion function. This represents the method in which the reference image and the input image are displayed on separate electrically addressed spatial light modulators so that they are coordinate-converted separately and their coordinate-converted intensity distribution images are electrically combined. Components having identical functions with those of the embodiment in FIG. 7 are assigned like reference numerals, and their explanation is omitted or simplified. The processing performed after the coordinate-converted intensity distribution images are electrically combined is the same as that mentioned in the embodiment of FIG. 7 and its explanation is omitted. The optical coordinate convertor of this embodiment has the following configuration. Means for producing two-dimensional reference image and input image consists of photographing devices 2, 22; at least one coherent light source consists of the laser 5, beam expander 6, laser 25, and beam expander 26; at least one object image spatial light modulator that holds the reference image and the input image is an electrically addressed spatial light modulators 3, 23; at least one coordinate conversion optical filter put close to the object image spatial light modulator is optical filters 4, 24; and at least one lens is lenses 7, 27. The point in which the joint transform correlator differs from the previous embodiment is as follows. Means for converting into coordinate-converted intensity distribution images the coordinate-converted images of the reference image and the input image obtained in the optical coordinate convertor and for displaying the coordinate-converted intensity distribution images on the coordinate-converted image spatial light modulator consists of a mask 8, photographing device 9, mask 28, photographing device 29, image processing device 41, and electrically addressed spatial light modulator 14.

An input object 1 and a reference object 21 are photographed by separate photographing devices 2, 22 and displayed as an input image and a reference image on the electrically addressed spatial light modulators 3, 23. The coherent beams emitted from the lasers 5, 25 are each expanded by the beam expanders 6, 26 to irradiate the electrically addressed spatial light modulators 3, 23. As a result, the reference image and the input image displayed are converted into coherent images. The coherent images pass through the optical filters 4, 24 placed immediately after the electrically addressed spatial light modulators 3, 23 and are then Fourier-transformed by the lenses 7, 27 to produce coordinate-converted images on the Fourier transfer plane. The masks 8, 28 are provided directly in front of the Fourier transfer plane to mask out unwanted dc bias components to allow only the necessary coordinate-converted images to pass through. The coordinate-converted images thus obtained are received by separate photographing devices 9, 29, which then convert them into electric signals. The electric signals are fed to the image processing device 41 where they are synthesized or combined. The synthesized signal is then supplied to the electrically addressed spatial light modulator 14, which displays the coordinate-converted intensity distribution images a specified distance L apart, as shown in FIG. 4. The processing after this step is the same as described in the previous embodiment of FIG. 7 and thus its explanation is omitted.

Figure 13:
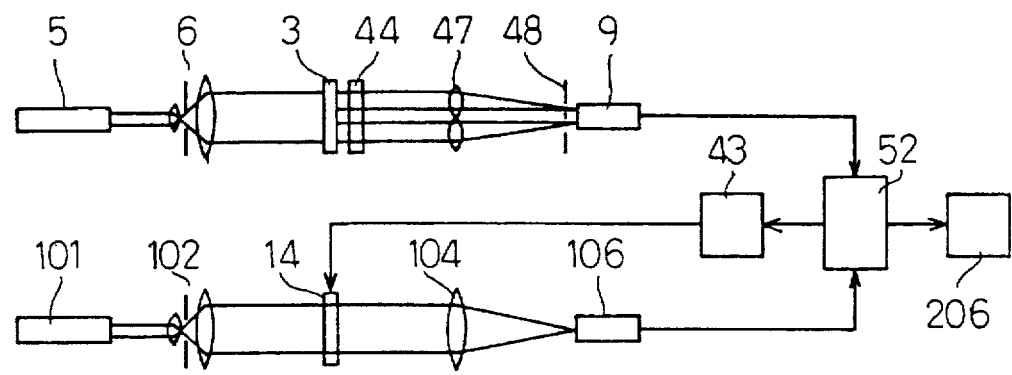
FIG. 13 is a schematic diagram showing the configuration of a further embodiment of the optical pattern recognition apparatus which has the coordinate conversion function.

FIG. 13 shows the configuration of a further embodiment of the optical pattern recognition apparatus, according to this invention, which has the coordinate conversion function. Components having identical functions with those of the embodiment in FIG. 7 are assigned like reference numerals, and their explanation is omitted or simplified. The optical coordinate convertor of this embodiment is the same as the one shown in FIG. 7. The point in which the joint transform correlator differs from the previous embodiment is as follows. A means for converting into coordinate-converted intensity distribution images, the coordinate-converted images of the reference image and the input image obtained in the optical coordinate convertor and for displaying the coordinate-converted intensity distribution images on the coordinate-converted image spatial light modulator consists of a mask 48, photographing device 9, image selector device 52, image memory device 43, and electrically addressed spatial light modulator 14. A means for converting into coherent images the coordinate-converted intensity distribution images displayed on the coordinate-converted image spatial light modulator consists of a laser 101 and a beam expander 102. A means for Fourier-transforming the coherent images by the lens to produce a joint Fourier-transformed image of the coordinate-converted intensity distribution images is a lens 104. A means for Fourier-transforming the joint Fourier-transformed image into a Fourier-transformed intensity distribution image and displaying the Fourier-transformed intensity distribution image on the Fourier-transformed image spatial light modulator, consists of a photographing device 106, image selector device 52, image memory device 43 and electrically addressed spatial light modulator 14. A means for reading the Fourier-transformed intensity distribution image displayed on the Fourier-transformed image spatial light modulator by using the coherent light consists of a laser 101 and a beam expander 102. A means for Fourier-transforming again by the lens the Fourier-transformed intensity distribution image thus read out to produce a correlation output image and for converting the correlation output image into a correlation signal by a photographing device or light receiving element, consists of a lens 104, photographing device 106 and image selector device 52. A means for processing the correlation signal to determine two-dimensional correlation coefficients of the reference image and the input image is an identification circuit 206.

The succeeding processing up to the step where the coordinate-converted images are received by the photographing device 9 is the same as in the embodiment of FIG. 7, and its explanation is omitted. The image selector device 52 of this embodiment cuts off or changes over its input and output electric signals. The electric signal output from the photographing device 9 is supplied through the image selector device 52 and image memory device 43 into the electrically addressed spatial light modulator 14 to display the coordinate-converted intensity distribution images a specified distance L apart on the electrically addressed spatial light modulator 14. The coherent beam emitted from the laser 101 is expanded by the beam expander 102 to irradiate the electrically addressed spatial light modulator 14. As a result, the coordinate-converted intensity distribution images are converted into coherent images, which are then Fourier-transformed by the lens 104 to form the joint Fourier-transformed image on the Fourier transfer plane. The joint Fourier-transformed image is received by the photographing device 106, which converts it into an electric signal. The electric signal is supplied through the image selector device 52 to the image memory device 43. At this time, the electric signal from the photographing device 9 is blocked by the image selector device 52 from being output to the image memory device 43. The signal from the photographing device 106 is stored in the image memory device 43, from which it is fed to the electrically addressed spatial light modulator 14, thus displaying the Fourier-transformed intensity distribution image of the joint Fourier-transformed image. The Fourier-transformed intensity distribution image is Fourier-transformed in the same way as the coordinate-converted intensity distribution image to produce a correlation output image. The correlation output image is received by the photographing device 106 which converts it into a correlation signal. The image selector device 52 now outputs the correlation signal to the identification circuit 206, which measures the correlation peak intensity to produce a correlation coefficient. This embodiment has the advantage of having fewer components in the optical system than in the embodiment of FIG. 7.

Figure 14:
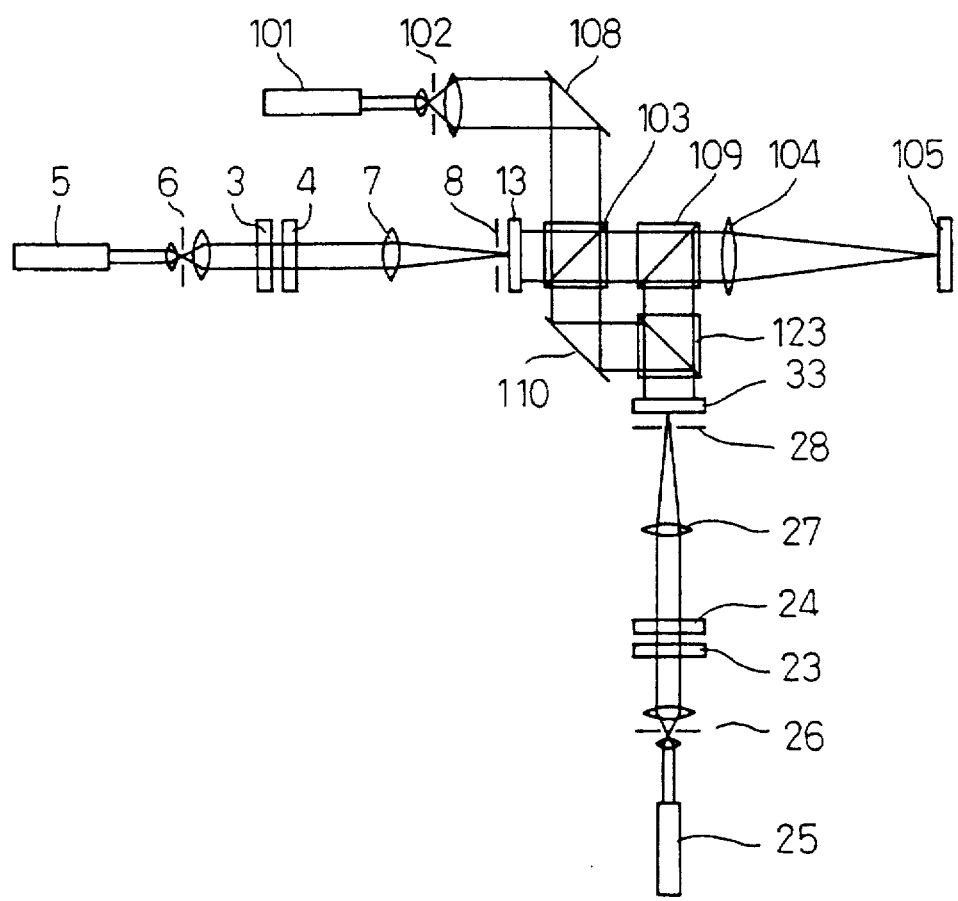
FIG. 14 is a schematic diagram showing the configuration of a further embodiment of the optical pattern recognition apparatus which has the coordinate conversion function.

FIG. 14 shows the configuration of a further embodiment of the optical pattern recognition apparatus, according to this invention, which has the coordinate conversion function. Components having identical functions with those of the embodiment in FIG. 12 are assigned like reference numerals, and their explanation is omitted or simplified. The optical coordinate convertor of this embodiment is the same as the one shown in FIG. 12. The point in which the joint transform correlator differs from the previous embodiment is as follows. A means for converting into coordinate-converted intensity distribution images the coordinate-converted images of the reference image and the input image obtained in the optical coordinate convertor and for displaying the coordinate-converted intensity distribution images on the coordinate-converted image spatial light modulator consists of a mask 8, light-addressed spatial light modulator 13, mask 28, and light-addressed spatial light modulator 33. A means for converting into coherent images the coordinate-converted intensity distribution images displayed on the coordinate-converted image spatial light modulator consists of a laser 101, a beam expander 102, a mirror 108, a light beam splitter 103, a mirror 110 and a polarizing beam splitter 123. A means for Fourier-transforming the coherent images by the lens to produce a joint Fourier-transformed image of the coordinate-converted intensity distribution images is a beam splitter 109 and a lens 104. A means for Fourier-transforming the joint Fourier-transformed image into a Fourier-transformed intensity distribution image and displaying the Fourier-transformed intensity distribution image on the Fourier-transformed image spatial light modulator, consists of a light-addressed spatial light modulator 105. The processing after this step is the same as that of the previous embodiment and its explanation is omitted.

The succeeding processing up to the steps where the coordinate-converted images of the input image and the reference image are formed on the Fourier transfer plane is the same as in the embodiment of FIG. 12. The coordinate-converted images on the Fourier-transfer plane are removed of unwanted dc bias components by the masks 8, 28 and radiated onto the write plane of the light-addressed spatial light modulators 13, 33 to display the coordinate-converted intensity distribution images on the light-addressed spatial light modulators 13, 33. The coherent beam emitted from the laser 101 is expanded by the beam expander 102, reflected by the mirror 108 and split into two beams by the polarizing beam splitter 103. One of the split beams irradiates, as the reading light, the read plane of the light-addressed spatial light modulator 13, while the other beam is reflected by the mirror 110 and the polarizing beam splitter 123 to radiate the read plane of the light-addressed spatial light modulator 33. As a result, the coordinate-converted intensity distribution images are converted into coherent images, which are then Fourier-transformed by the lens 104, via the polarizing beam splitters 103, 123 and the beam splitter 109, to form the joint Fourier-transformed image on the Fourier transfer plane. By disposing throwing the joint Fourier-transformed image onto the write plane of the light-addressed spatial light modulator 105, the Fourier-transformed intensity distribution image is displayed on the light-addressed spatial light modulator 105. The processing that follows is the same as with other embodiments and its explanation is omitted.

When there is a difference in size and kind between the input image and the reference image, it may become impossible to perform accurate pattern recognition due to variations in light intensity of the coordinate-converted images. To overcome such a drawback, the light intensity of the coordinate-converted image is optimized to enable more precise pattern recognition. One such embodiment is shown in FIG. 15. An automatic light regulator has the following configuration. A means for measuring the light intensity or the change of light intensity of the coordinate-converted image, joint Fourier-transformed image or correlation output image consists of a light intensity measuring beam splitter 45 and a light receiving element array 49. A means for changing the light intensity according to the light intensity or changes of light intensity or a means for changing the light reception sensitivity of the coordinate-converted image spatial light modulator, Fourier-transformed image spatial light modulator, photographing device or the light receiving element consists of a light intensity regulator 50 and a liquid crystal mask 51.

The method of producing the coordinate-converted images and the processing thereafter are the same as those for other embodiments, and thus their explanation is omitted. A part of the light quantities of the coordinate-converted images is divided by the light intensity measuring beam splitter 45 and radiated onto the light receiving element 49. The light receiving elements on the light receiving element array 49 are arranged at positions corresponding to the associated coordinate-converted images. Based on the outputs from the respective light receiving elements, the light intensity or the rate of change of light intensity of the coordinate-converted images can be measured. The output is entered into the light intensity regulator 50 located immediately before or after the electrically addressed spatial light modulator 13 to operate the liquid crystal mask so that the light intensities of the coordinate-converted images are equal or they are optimal to the light reception sensitivity of the light-addressed spatial light modulator 13. That is, by changing the transmission factor of parts of the liquid crystal mask 51 that correspond to the input image and the reference image, the light intensities of the coordinate-converted images are made equal. With this method, the light intensities of the coordinate-converted images become equal, enabling accurate pattern recognition even when the size and kind of the reference image and the input image vary. Similar effects can be obtained by using the electrically addressed spatial light modulator 3 instead of the liquid crystal mask 51.

The accurate pattern recognition is also possible by optimizing the light intensities of the joint Fourier-transformed image and the correlation output image.

A problem that may arise from performing the above optical coordinate conversion is that since the shift invariability is lost, the correct pattern recognition becomes impossible when the input image is moved parallelly. For example, in a normal pattern recognition apparatus of the VanderLugt type that does not perform the optical coordinate conversion, let us consider a case where the direction and size of the input image are the same as those of the reference image. As mentioned earlier, since the characteristic of the Fourier transform provides shift invariability, accurate recognition is assured even when the position on the object plane of the input image differs from (is parallelly moved from) the position of the reference image that existed when the matched filter was made. In the pattern recognition apparatus that perform the optical coordinate conversion as shown in FIG. 3, when the position of the input image displayed on the liquid crystal television 303 is different from and parallelly moved from the position of the reference image that existed during the making of the matched filter, the relative positional relationship between the coordinate conversion optical filter 304 and the reference image and input image changes. As a result, the coordinate-converted image of the reference image differs in shape from that of the input image. For this reason, it is not possible to perform accurate recognition by using such coordinate-converted images. This also applies either to the VanderLugt type of the correlator as shown in FIG. 3 or to the joint transform type of the correlator.

To eliminate this problem, the optical coordinate convertor performs preprocessing—which transforms the reference image and the input image by electronic or optical means so that they are shift-invariable—and then performs a desired optical coordinate conversion on the shift-invariable intensity distribution image so that the image will be invariable to the rotational and size changes. This ensures a pattern recognition, which is invariable not only for the rotation and size change but also for shifts. The following procedure will be taken for transforming the images so that they are optically shift-invariable. First, the input image and the reference image are Fourier-transformed by using coherent light. As a result, even when the input image displayed is parallelly moved on the spatial light modulator, only the phase component of the Fourier-transformed image changes because of the characteristic of the Fourier transform and no change occurs in the intensity distribution. The Fourier-transformed intensity distribution image (shift-invariable intensity distribution image) is subjected to a desired optical coordinate conversion and to the correlation processing so as to be shift-invariable.

The method of electronically making the image shift-invariable involves calculating the center of gravity of the reference image and the input image by computer and performing computer image processing so that the gravity centers of the images assume specified positions on the shift-invariable image spatial light modulator at all times. As a result, the relative positional relationship between the reference image and the corresponding coordinate conversion optical filter is always the same as that between the input image and the coordinate conversion optical filter. By performing a desired optical coordinate conversion on the images processed as described above and then subjecting the images to the correlation processing, the result of the correlation processing becomes shift-invariable.

FIG. 16 shows the configuration of a further embodiment of the optical pattern recognition apparatus, according to this invention, which has the coordinate conversion function.

The optical coordinate convertor of this embodiment has the following configuration. At least one coherent light source consists of a laser 461, beam expander 462, laser 405, beam expander 406, and polarizing beam splitter 412. A means for obtaining a two-dimensional reference image and input image consists of a photographing device 402, image processing device 442 and image memory device 43. A means for optically or electronically converting the reference image and the input image so that they are shift-invariable and then displaying these shift-invariable images on at least one shift-invariably transformed image spatial light modulator, consists of an electrically addressed spatial light modulator 403, lens array 464 and light-addressed spatial light modulator 465. At least one coordinate conversion optical filter put close to the shift-invariably transformed image spatial light modulator is a filter array 44. At least one lens is a lens array 47.

A joint transform correlator has the following configuration. A means for converting into coordinate-converted intensity distribution images the coordinate-converted images of the reference image and the input image obtained in the optical coordinate convertor and for displaying the coordinate-converted intensity distribution images on the coordinate-converted image spatial light modulator, consists of a mask 48 and an light-addressed spatial light modulator 413. A means for converting the coordinate-converted intensity distribution images displayed on the spatial light modulator 413 into coherent images consists of a laser 101, a beam expander 102, and a polarizing beam splitter 103. A means for Fourier-transforming the coherent images by using a lens and producing a joint Fourier-transformed image of the coordinate-converted intensity distribution images consists of a lens 104. A means for converting the joint Fourier-transformed image into a Fourier-transformed intensity distribution image and displaying the Fourier-transformed intensity distribution image on a Fourier-transformed image spatial light modulator consists of a light-addressed spatial light modulator 105. A means for reading by the coherent light the Fourier-transformed intensity distribution image displayed on the Fourier-transformed image spatial light modulator 105 consists of a laser 201, a beam expander 202 and a polarizing beam splitter 203. A means for Fourier-transforming again the Fourier-transformed intensity distribution image thus read out by using a lens to produce a correlation output image and then converting the correlation output image into a correlation signal by using a photographing device or a light receiving element, consists of a lens 204 and a light receiving element 205. A means for processing the correlation signal to determine two-dimensional correlation coefficients of the reference image and the input image consists of an identification circuit 206.

First, the reference object, database of a reference for pattern recognition, is placed at a position of an input object 1 and photographed by a photographing device 402 to produce a two-dimensional reference image. The two-dimensional reference image is then stored via an image processor 442 into an image memory device 43. Likewise, an input object 1, which is to be identified, is photographed by the photographing device 402 to produce a two-dimensional input image. The input image and the reference image, the latter being stored in the image memory device 43, are synthesized by the image processor 442 and displayed on an electrically addressed spatial light modulator 403. Where the input object 1 that changes its position with time is to be recognized, the input image displayed on the electrically addressed spatial light modulator 403 also changes its position as the input object 1 moves. In order that the reference image and the input image do not overlap in such a case, these images are formed separately as shown in FIG. 4. As the input object 1 moves, it is needless to say that the positional relationship such as a distance between the reference image and the input image also changes.

The coherent light emitted from the laser 461 is expanded by a beam expander 462 into a parallel-ray beam of a specified diameter and then radiated onto the electrically addressed spatial light modulator 403 on which the input image and the reference image are displayed. Then, these images are converted into coherent images. The coherent images are Fourier-transformed by each shift-invariable lens of the lens array 464 to produce a Fourier-transformed image as a shift-invariable image on the Fourier transfer plane. The shift-invariable lenses on the lens array 464 correspond to the input image and the reference image displayed on the electrically addressed spatial light modulator 403. The lenses are a specified distance L apart.

Placed on the Fourier transfer plane where the Fourier-transformed image is obtained are a light-addressed spatial light modulator 465 and a filter array 44 immediately in front of the modulator 465. In this arrangement, the Fourier-transformed images of the reference and input images superimposed with the coordinate conversion optical filter are radiated onto the write plane of the light-addressed spatial light modulator 465. As a result, the Fourier-transformed images of the input and reference images superimposed with the coordinate conversion optical filter are converted into intensity distributions and displayed as the shift-invariably transformed images a distance L apart on the light-addressed spatial light modulator 465. There are many kinds of light-addressed spatial light modulators 465. In this embodiment, the configuration that employs the reflection type liquid crystal light valve using a ferroelectric liquid crystal as the light modulating material will be explained. The electrically addressed spatial light modulator 403 is placed on the front focal plane of the lens array 464. On the rear focal plane the light-addressed spatial light modulator 465 and the optical filter array 44 are put close together.

Figure 19:
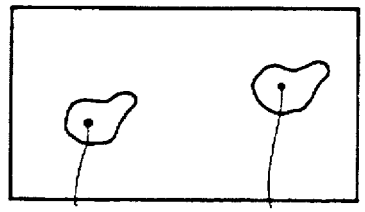
FIG. 19 is an example method of displaying a reference image and a shifted input image on an electrically addressed spatial light modulator.

The optically filter array 44 consists of two coordinate conversion optical filters—made by the computer-synthesized hologram as already mentioned—placed a specified distance L apart at positions corresponding to the shift-invariable lenses. In the coordinate conversion process, if images to be converted are not in the same positional relationship with respect to the coordinate conversion optical filter, the conversion will produce different coordinate-converted images even when the same image is coordinate-converted. For this reason, the distance between the two coordinate conversion optical filters must be equal to the distance L between the Fourier-transformed images (equal to the distance between the shift-invariable lenses). The coordinate conversion optical filters are arranged so that the relative positional relationships between the Fourier-transformed images of the input and reference images and the coordinate conversion optical filters are equal. With this arrangement, if the position of the input image is moved parallelly on the electrically addressed spatial light modulator 403 as shown in FIG. 19, the intensity distribution of the Fourier-transformed image does not change at all although its phase changes. Hence, the relative positional relationship between the Fourier-transformed image of the input image and the corresponding coordinate conversion optical filter does not change, so that its coordinate-converted image remain unchanged.

The coherent light emitted from the laser 405 is expanded by a beam expander 406 into a parallel-ray beam of a specified diameter and then reflected by a polarizing beam splitter 412 to radiate onto the read plane of the light-addressed spatial light modulator 465 as the reading light. The polarizing direction of the reading light is aligned beforehand with the alignment direction of the liquid crystal molecules (or aligned with a direction perpendicular to it), in which direction the liquid crystal molecules are aligned by initialization of the spatial light modulator 465. By passing the reading light—which was reflected by the light-addressed spatial light modulator 465—through a detector whose polarizing axis is set perpendicular or parallel to the polarization direction of the reading light, the image displayed on the light-addressed spatial light modulator 465 can be read out as a positive image or a negative image. In this embodiment, a polarizing beam splitter 412 is used as a detector.

In this way, the shift-invariable intensity distribution images of the input image and the reference image are converted into coherent images. These coherent images are Fourier-transformed by the coordinate conversion lenses of the lens array 47. As a result, coordinate-converted images that are converted into a desired coordinate system are formed on the Fourier transfer planes. A mask 48 placed immediately before the light-addressed spatial light modulator 413 are formed with holes to allow only the +first order coordinate-converted images to pass through. This cuts off unwanted dc bias components and high-order coordinate-converted images, and only the necessary coordinate-converted images, which represent the shift-invariable intensity distribution images of the reference and input images, pass through the mask to radiate onto the write plane of the light-addressed spatial light modulator 413. The coordinate-converted images, which represent the shift-invariable intensity distribution images of the input and reference images, are converted into coordinate-converted intensity distribution images, which are displayed a distance L apart on the light-addressed spatial light modulator 413. There are many kinds of light-addressed spatial light modulator 413. In this embodiment, the light-addressed spatial light modulator, like the light-addressed spatial light modulator 465, employs a reflection type liquid crystal light valve which uses a ferroelectric liquid crystal as the light modulating material.

On the front focal plane of the lens array 47 is located the light-addressed spatial light modulator 465. On the rear focal plane is positioned the light-addressed spatial light modulator 413. The coordinate conversion lenses of the lens array 47, as with the coordinate conversion optical filters, are arranged a distance L apart at positions that correspond to the two shift-invariable intensity distribution images being converted. The processing that follows is the same as the one described in the embodiment of FIG. 1 and thus its explanation is omitted.

For strict Fourier transform, it is preferred that the image to be Fourier-transformed be put on the front focal plane of each Fourier transform lens or between the lens and its rear focal plane. Then the Fourier-transformed image is formed on the rear focal plane of the lens. In this embodiment, therefore, the image is placed on the front focal plane of the lens array 464, 47 and lens 104, 204 and the Fourier-transformed image is received on the rear focal plane.

In the above embodiment, the optical filter array. 44 is placed immediately before the light-addressed spatial light modulator 465. The Fourier-transformed images of the reference image and the input image superimposed with the coordinate conversion optical filter are transformed into intensity distributions, which are displayed as the shift-invariable intensity distribution images on the light-addressed spatial light modulator 465. The optical filter array 44 may be located immediately after the light-addressed spatial light modulator 465 (on the read plane side) rather than immediately before it (on the write plane side). In that case, the Fourier-transformed images not superimposed with the coordinate conversion optical filter are transformed into intensity distributions, which are displayed as the shift-invariable intensity distribution images on the light-addressed spatial light modulator 465. The reading light passes through the coordinate conversion optical filter array 44 two times.

When as in the above embodiment the Fourier-transformed images superimposed with the coordinate conversion optical filter are transformed into intensity distributions, the coordinate conversion optical filter must be of the amplitude modulation type. However, when the optical filter array is arranged immediately after the light-addressed spatial light modulator 465, the coordinate conversion optical filter may be either of the amplitude modulation type or phase modulation type.

Where there are a number of light-addressed spatial light modulators connected in series to record and read images successively, the writing, erasing and reading of images to and from the light-addressed spatial light modulator must be synchronized with each other. In the case of the liquid crystal light valve using a ferro-electric liquid crystal in this embodiment, the write pulse and erase pulse applied to the liquid crystal light valves and the reading light and writing light application times should be synchronized so that the duration in which the writing light is radiated onto the write plane of the liquid crystal light valve and the time during which the write voltage is applied to the liquid crystal light valve overlap for at least a specified period. With such a drive method, the light-addressed spatial light modulators 465, 413, 105 can be driven at high speed of 30 Hz–2 kHz.

Next, let us explain about the electrically addressed spatial light modulator 403 used in the above embodiment. The operation of the electrically addressed spatial light modulator 403, too, must be synchronized with other spatial light modulators and lasers, as in the case of the light-addressed spatial light modulators 465, 105. In this embodiment, therefore, an electrically addressed spatial light modulator using a ferroelectric liquid crystal as the light modulating material is used for the electrically addressed spatial light modulator 403. This permits the electrically addressed spatial light modulator 403 to be operated at high speed in synchronism with other spatial light modulators.

In this embodiment, a coordinate conversion optical filter is used, which converts the image into the (lnr, θ) coordinate system. This filter enables the input image to be identified for the rotating angle of up to 360 degrees and the size change of up to 50%, assuring invariable pattern recognition for input images having rotation and size changes, as in the first embodiment. It is also possible to determine the rotating angle and the size change based on the position where the correlation peak appears. Furthermore, where a coordinate conversion optical filter is used which converts an image into other coordinate system, this invention permits an invariable pattern recognition for the coordinate-converted images having rotation and size changes.

This embodiment ensures a pattern recognition, which is invariable not only for the rotation and size change but also for shifts. In this embodiment, when a reference image and an input image as shown in FIG. 4 are considered, the reference image is stored in the image memory device 43, so that the image position on the electrically addressed spatial light modulator 403 remains unchanged. As shown in FIG. 19, the input image changes its position on the electrically addressed spatial light modulator 403 as the input object 1 moves. However, since, as mentioned earlier, the input image is made shift-invariable by the preprocessing before the coordinate conversion, the intensity distribution of the Fourier-transformed image (shift-invariable intensity distribution image) does not change even when the position of the input image is changed by the Fourier transform. Hence, the relative positional relationship between each shift-invariable intensity distribution image and the corresponding coordinate conversion optical filter remains unchanged, so that their coordinate-converted images do not change, making the results of the correlation processing invariable for shifts of the input image. It is obvious that the invariable correlation processing is possible also when the reference image is changed and its position shifted.

When the input object i moves through a three-dimensional space, the size, direction and position of the input image on the electrically addressed spatial light modulator 403 change. By using an appropriate coordinate conversion optical filter, it is possible to perform accurate pattern recognition on the input image as the object moves.

As to the recognition speed, when the spatial light modulator is used which employs a ferroelectric liquid crystal as the light modulating material and which can operate at 30 Hz–2 kHz, the pattern recognition apparatus can operate at high speed of around 30 Hz–20 kHz.

FIG. 17 shows the configuration of a further embodiment of the optical pattern recognition apparatus, according to this invention, which has the coordinate conversion function. This represents a system which employs an electrically addressed spatial light modulator instead of a light-addressed spatial light modulator 465. The joint transform correlator is the same as that shown in FIG. 16 and its drawing is omitted. The components having functions identical with those of the embodiment of FIG. 16 are given like reference numerals and their explanation omitted or simplified.

The optical coordinate convertor of this embodiment differs from the embodiment of FIG. 16 in the following respects. A means is provided for optically or electronically converting the reference image and the input image into shift-invariable images and then displaying the shift-invariable images on at least one shift-invariable image spatial light modulator. This means consists of an electrically addressed spatial light modulator 403, a lens array 464, a photographing device 466, a binarizing circuit 467, and an electrically addressed spatial light modulator 468.

The reference image and the input image displayed on the electrically addressed spatial light modulator 403 are Fourier-transformed in a way similar to that shown in FIG. 16. The Fourier-transformed images are directly entered into the photographing device 466 where they are converted into image signals. The image signals are binarized by a binarizing circuit 467 and fed to the electrically addressed spatial light modulator 468 where the Fourier-transformed images of reference image and input image are converted into binarized intensity distribution images and displayed as binarized shift-invariable intensity distribution images. As the photographing device 466 and electrically addressed spatial light modulator 468 in this embodiment, a transmission type spatial light modulator such as a CCD camera and liquid crystal television is used.

If it is not necessary to binarize shift-invariable intensity distribution image, the binarizing circuit 467 is not needed. By setting an appropriate threshold value for binarizing, a clear binarized shift-invariable intensity distribution image with little noise can be obtained. For this reason, this embodiment employs the binarizing processing.

The optical filter array 44 is put immediately before or after the electrically addressed spatial light modulator 468, and the coherent light emitted from the laser 405 reads out the shift-invariable intensity distribution images superimposed with the coordinate conversion optical filter. The processing that follows is the same as that of FIG. 16 and thus its explanation is omitted.

Figure 18:
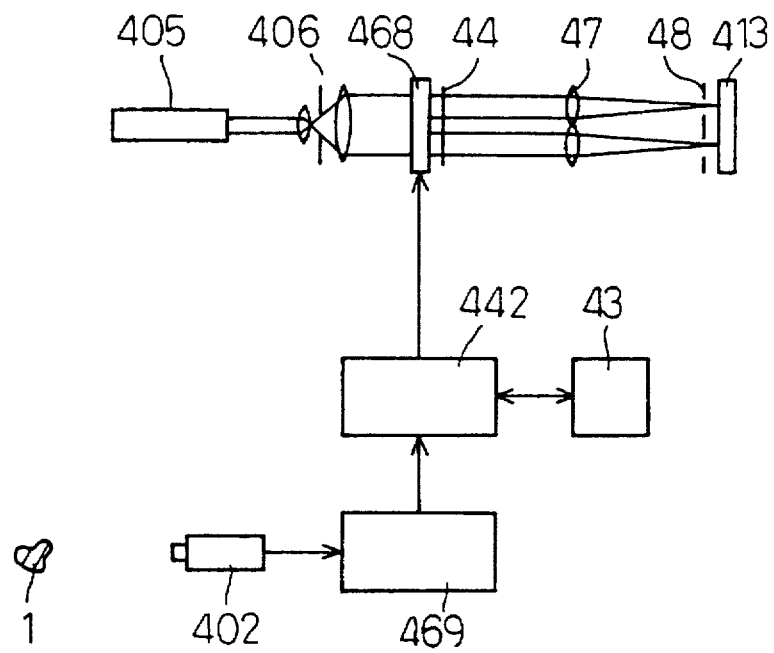
FIG. 18 is a schematic diagram showing the configuration of a further embodiment of the optical pattern recognition apparatus which has the coordinate conversion function.

FIG. 18 shows the configuration of a further embodiment of the optical pattern recognition apparatus, according to this invention, which has the coordinate conversion function. This represents a case where the reference image and the input image are transformed into shift-invariable images electronically by a computer rather than optically. The joint transform correlator is the same as that of the embodiment in FIG. 16 and its drawing is not shown. The components having functions identical with those of the embodiment of FIG. 16 are given like reference numerals and their explanation omitted or simplified.

The points in which the optical coordinate convertor differs from the embodiment of FIG. 16 are shown below. At least one coherent light source consists of a laser 405 and a beam expander 406. A means for producing a two-dimensional reference image and input image consists of a photographing device 402, an image processing device 422 and an image memory device 43. A means for optically or electronically transforming the reference image and the input image into shift-invariable images and displaying the shift-invariable images on at least one shift-invariable image spatial light modulator consists of a computer 469 and an electrically addressed spatial light modulator 468.

Figure 20:
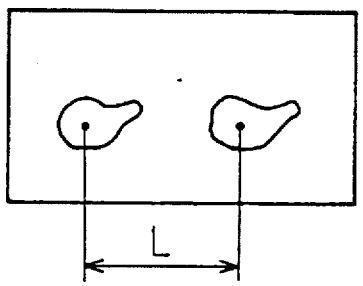
FIG. 20 is an example method of displaying shift-invariable intensity distribution images of a reference image and an input image, a distance L apart, on an electrically addressed spatial light modulator.

As in the embodiment shown in FIG. 16, a two-dimensional reference image is obtained from the photographing device 402. The reference image is processed by the computer 469 to calculate the barycenter position G and is fed through the image processing device 442 to the image memory device 43 where it is stored as a shift-invariable intensity distribution image. Next, the input image is processed similarly. The barycenter G' is calculated and, based on the barycenter position, the shift-invariable intensity distribution image is determined. The shift-invariable intensity distribution image of the input image and the shift-invariable intensity distribution image of the reference image, the latter being stored in the image memory device 43, are combined by the image processing device 442 to display the combined image on the electrically addressed spatial light modulator 468. The image combination is done so that, as shown in FIG. 20, the distance GG' between the barycenters on the electrically addressed spatial light modulator 468 is equal to the distance L between the coordinate conversion optical filters and that the relative positional relationships between the shift-invariable intensity distribution images and the coordinate conversion optical filters are equal. The processing that follows is the same as those of the embodiments shown in FIG. 16 and 17 and its explanation is omitted. The optical filter array 44 may be placed immediately before the electrically addressed spatial light modulator 468.

Now, the image processing as performed by the computer 469 will be explained. First, the reference image and the input image entered from the object image photographing device are binarized. The reason for digitizing the image is that the image taken in from the ordinary photographing device has a gradation and the processing of such an image by the computer produces a large amount of image data, requiring longer time to process. Next, the positions of the barycenters G, G' of the reference image and the input image are calculated. Finally, if the positions of the barycenters of the reference image and the input image agree, no further processing is done. When they do not agree, the input image is moved parallelly until the barycenters agree.

In the input image that has been subjected to the above processing, the position of the barycenter remains unchanged regardless of the movement of the input object 1 and thus the image is a shift-invariable intensity distribution image. Then, the shift-invariable intensity distribution images of the reference image and the input image are located at positions corresponding to the coordinate conversion optical filters so that the distance between their barycenters is equal to a distance L. The shift-invariable intensity distribution images are then synthesized and displayed on the electrically addressed spatial light modulator 468. Then, the relative positional relationship-between each shift-invariable intensity distribution image and the corresponding coordinate conversion optical filter remains unchanged, permitting an invariable correlation processing for any shifts of the input image, as in other embodiments.

In the above embodiment, if the light-addressed spatial light modulator is replaced by a combination of a photographing device like a CCD camera and an electrically addressed spatial light modulator like a liquid crystal television, the same working principle is obtained.

The above embodiment displays the reference image and the input image simultaneously on the electrically addressed spatial light modulator 403 and performs the shift-invariable processing and the optical coordinate conversion processing parallelly. The same effect can be obtained in principle by the following method. Only the reference image is transformed into a shift-invariable image or a coordinate-converted image in advance and the transformed image is stored in the image memory device 43. Then, the input images to be processed successively are transformed either into shift-invariable images or coordinate-converted images. The shift-invariable or coordinate-converted reference images and input images are electrically synthesized by the image processing device 442 and are parallelly displayed on the shift-invariable or coordinate-converted image electrically addressed spatial light modulator for correlation processing.

In the above embodiment, the lasers 5, 25, 405, 461, 101, 201 need only be such lasers as gas laser or a semiconductor laser that has a good coherence. While the above embodiment uses many lasers, it is also possible to split the output from one laser into many beams.

While the above embodiment employs a transmission type electrically addressed spatial light modulator 3, 23, 403 to display the reference image and the input image parallelly, it is also possible to use a reflection type light-addressed spatial light modulator to produce the similar effect.

While, in the above embodiment, the reference object 21 is photographed by the photographing device 22 and the reference image is stored in the image memory device 43, it is possible to photograph the reference object 21 along with the input object 1 by the photographing device 2, 22, 402 and display them on the electrically addressed spatial light modulator 3, 403. In this case, since there is no need to synthesize the reference image and the input image, the image processing device 42, 442 and the image memory device 43 are not required.

The above embodiment stores the reference image in the image memory device 43. However, it is also possible to photograph the reference object 21 and the input object 1 by separate object image photographing devices and synthesize the reference image and the input image by the image processing device 42, 442 to display the synthesized image on the electrically addressed spatial light modulator 3, 403. In this case, the image memory device 43 becomes unnecessary.

The above embodiment synthesizes the reference image and the input image by the image processing device 42, 442 and displays the electrically addressed spatial light modulator 3, 403. Rather than synthesizing the reference image and the input image, it is possible to display them on two parallelly arranged electrically addressed spatial light modulators for producing the object image.

In the above embodiment the correlation processing is performed between one reference image and one input image. When a number of correlation processings are to be performed by using multiple input images or reference images, it is only necessary to increase the number of shift-invariable lenses such as lens array 64, 464, the coordinate conversion optical filters such as optical filter array 44 and the coordinate conversion lenses such as lens array 47 and arrange them at positions corresponding to the reference images and input images.

In the embodiment shown above, the coordinate conversion into optical shift-invariable images is done by using the shift-invariable lens array 64, 464 and the coordinate-conversion lens array 47. Rather than using the lens array, the images may be converted into the shift-invariable images or coordinate-converted images by using separate optical systems. The converted images may then be synthesized by the beam splitter and radiated onto the write plane of the shift-invariable image light-addressed spatial light modulator 65, 465 and the coordinate conversion light-addressed spatial light modulator 13, 413.

The coordinate conversion optical filter may be of an amplitude modulation type or a phase modulation type.

As described above, this invention employs as the preprocessing for the joint transform correlator the optical coordinate convertor that performs coordinate conversion on the reference image and the input image. This permits accurate pattern recognition even when the input object changes its size and direction. In the optical coordinate convertor, the reference image and the input image are converted into shift-invariable images before being subjected to the optical coordinate conversion. This allows an invariable pattern recognition when the position of the input image changes. Further, when the light-addressed or electrically addressed spatial light modulator formed of ferroelectric liquid crystal is used, high-speed operation at around 30 Hz–2 kHz is possible. Moreover, when a feedback system is added, the reference object can also be correlation-processed at the same time. The invention enables changing the kind of coordinate conversion and the reference image at high speed and with ease. These in turn permit a very quick and accurate pattern recognition, leading to an increased operation speed and lower cost in the fields of pattern recognition and inspection systems.

We claim:

1. An optical pattern recognition apparatus for automatically identifying and measuring specified patterns by performing optical correlation processing, by using coherent light, on two-dimensional images obtained from a photographing means, the optical pattern recognition apparatus comprising:

an optical coordinate convertor unit for converting simultaneously and in parallel at least one entered reference image and at least one entered input image from an entered coordinate system to a desired coordinate system to produce a coordinate-converted reference image of each entered reference image and a coordinate-converted input image of each entered input image, the optical coordinate convertor unit comprising means for producing a two-dimensional reference image and input image of said each reference image and said each input image, respectively, at least one coherent light source, at least one object image spatial light modulator for recording the two-dimensional reference image and the two-dimensional input image, at least one coordinate conversion optical filter placed close to the object image spatial light modulator, and at least one lens; and a joint transform correlator for generating a correlation coefficient between each coordinate-converted reference image and each coordinate-converted input image, the joint transform correlator comprising means for converting said each coordinate-converted reference image add said each coordinate-converted input image produced by the optical coordinate convertor into respective coordinate-converted intensity distribution images and then displaying the coordinate-converted intensity distribution images on a coordinate-converted image spatial light modulator, means for converting the coordinate-converted intensity distribution images displayed on the coordinate-converted image spatial light modulator into respective coherent images, means for converting the coherent images into a joint Fourier-transformed image of the coordinate-converted intensity distribution images using a Fourier-transform lens, means for converting the joint Fourier-transformed image into a Fourier-transformed intensity distribution image and displaying the Fourier-transformed intensity distribution image on a Fourier-transformed image spatial light modulator, means for reading the Fourier-transformed intensity distribution image displayed on the Fourier-transformed image spatial light modulator using coherent light, means for generating a correlation output image by Fourier-transforming the Fourier-transformed intensity distribution image, means for converting the correlation output image into a correlation signal using either a photographing device or light receiving element, and means for processing the correlation signal to determine two-dimensional correlation coefficients of said each two-dimensional reference image and said each two-dimensional input image so that a correlation between said each entered reference image and said each entered input image is obtained to effect pattern recognition in real time.

2. An optical pattern recognition apparatus according to claim 1; further comprising a feedback circuit, the feedback circuit comprising a normalization circuit for normalizing the two-dimensional coefficients with a maximum correlation coefficient, a mask spatial light modulator placed immediately adjacent to one of the object image spatial light modulator and the coordinate-converted image spatial light modulator, and means for changing at least one of the transmission factor and the reflection factor of parts of the mask spatial light modulator that correspond to either of said each reference image or the coordinate-converted intensity distribution image in either of a linear or non-linear relationship according to the correlation coefficient normalized by the normalization circuit.

3. An optical pattern recognition apparatus according to claim 2; wherein at least one of the transmission factor and the reflection factor of the parts of the mask spatial light modulator that correspond to either of said each reference image and said each input image or to the coordinate-converted intensity distribution images is changed according to one of (1) a ratio of areas between said each reference image and said each input image, (2) a ratio of areas between the coordinate-converted intensity distribution images, and (3) either the transmitted or the reflected light intensity; and further comprising normalization means for making equal the intensities of the Fourier-transformed images of the coordinate-converted intensity distribution images.

4. An optical pattern recognition apparatus according to claim 2; wherein the non-linear relationship in the feedback circuit is represented by one of a saturation type function, a step function with more than one stage, and a combination of both a saturation type function and a step function with more than one stage.

5. An optical pattern recognition apparatus according to claim 1; wherein the means for converting said each coordinate-converted reference image and said each coordinate-converted input image into respective coordinate-converted intensity distribution images and then displaying the coordinate-converted intensity distribution images on the coordinate-converted image spatial light modulator comprises means for converting the coordinate-converted images into binarized coordinate-converted intensity distribution images and displaying the binarized coordinate-converted intensity distribution images on the coordinate-converted image spatial light modulator.

6. An optical pattern recognition apparatus according to claim 5; wherein the coordinate-converted image spatial light modulator comprises a light-addressed spatial light modulator using a ferroelectric liquid crystal having a bistable memory capability.

7. An optical pattern recognition apparatus according to claim 5; wherein the means for converting the coordinate-converted images into the binarized coordinate-converted intensity distribution images and displaying the binarized coordinate-converted intensity distribution images on the coordinate-converted image spatial light modulator comprises a photographing device for converting the coordinate-converted images to an image signal, binarizing means for binarizing the image signal, and an electrically addressed coordinate-converted image spatial light modulator for displaying the binarized image signal.

8. An optical pattern recognition apparatus according to claim 5; wherein the coordinate-converted image spatial light modulator comprises an electrically addressed spatial light modulator using a ferroelectric liquid crystal having a bistable memory capability.

9. An optical pattern recognition apparatus according to claim 1; wherein the means for converting the joint Fourier-transformed image into the Fourier-transformed intensity distribution image and displaying the Fourier-transformed intensity distribution image on the Fourier-transformed image spatial light modulator includes means for converting the joint Fourier-transformed image into a binarized Fourier-transformed intensity distribution image and displaying the binarized Fourier-transformed intensity distribution image on the Fourier-transformed image spatial light modulator.

10. An optical pattern recognition apparatus according to claim 9; wherein the Fourier-transformed image spatial light modulator comprises a light-addressed spatial light modulator using a ferroelectric liquid crystal having a bistable memory capability.

11. An optical pattern recognition apparatus according to claim 9; wherein the means for converting the joint Fourier-transformed image into the binarized Fourier-transformed intensity distribution image and displaying the binarized Fourier-transformed intensity distribution image on the Fourier-transformed-image spatial light modulator comprises a photographing device for converting the joint Fourier-transformed image into an image signal, binarizing means for binarizing the image signal, and a Fourier-transformed image spatial light modulator for displaying the binarized image signal.

12. An optical pattern recognition apparatus according to claim 9; wherein the Fourier-transformed image spatial light modulator comprises an electrically addressed spatial light modulator using a ferroelectric liquid crystal having a bistable memory capability.

13. An optical pattern recognition apparatus according to claim 1; further comprising an automatic light regulator, the automatic light regulator including means for measuring one of the light intensity and change in the light intensity of one of the coordinate-converted image, the joint Fourier-transformed image and the correlation output image, and one of (1) means for changing the light intensity according to either the light intensity or the change in the light intensity, and (2) means for changing the light reception sensitivity of one of the coordinate-converted image spatial light modulator, the Fourier-transformed image spatial light modulator, the photographing device and the light receiving element.

14. An optical pattern recognition apparatus for automatically identifying and measuring specified patterns by performing optical correlation processing, using coherent light, on two-dimensional images obtained from a photographing means, the optical pattern recognition apparatus comprising:

an optical coordinate converter unit for converting simultaneously and in parallel at least one reference image and at least one input image from an entered coordinate system to a desired coordinate system to produce a coordinate-converted reference image of each entered reference image and a coordinate-converted input image of each entered input image, the optical coordinate converter unit comprising a least one coherent light source, means for producing a two-dimensional reference image from said each entered reference image and a two-dimensional input image from said each entered input image, converting means for optically or electronically converting said each two-dimensional reference image and said each two-dimensional input image into a respective shift-invariable image and then displaying each shift-invariable reference image and each shift-invariable input image on at least one shift-invariable image spatial light modulator, at least one coordinate conversion optical filter placed close to each shift-invariable image spatial light modulator, and at least one lens; and a joint transform correlator for generating a correlation coefficient between each coordinate-converted reference image and each coordinate-converted input image, the joint transform correlator comprising means for converting said each coordinate-converted reference image and said each coordinate-converted input image into respective coordinate-converted intensity distribution images for display on a coordinate-converted image spatial light modulator, means for converting the coordinate-converted intensity distribution images displayed on the coordinate-converted image spatial light modulator into respective coherent images, means for converting the coherent images into a joint Fourier-transformed image of the coordinate-converted intensity distribution images using a Fourier-transforming lens, means for converting the joint Fourier-transformed image into a Fourier-transformed intensity distribution image and displaying the Fourier-transformed intensity distribution image on a Fourier-transformed image spatial light modulator, means for reading the Fourier-transformed intensity distribution image displayed on the Fourier-transformed image spatial light modulator using coherent light, means for generating a correlation output image by Fourier-transforming the Fourier-transformed intensity distribution image, means for converting the correlation output image into a correlation signal using either a photographing device or a light receiving element, and means for processing the correlation signal to determine two-dimensional correlation coefficients of said each two-dimensional reference image and said each two-dimensional input image so that a correlation between said each entered reference image and said each entered input image is obtained to effect pattern recognition in real time.

15. An optical pattern recognition apparatus according to claim 14; wherein the converting means further comprises means for Fourier-transforming said each two-dimensional reference image and said each two-dimensional input image by using coherent light into the shift-invariable images, and means for converting the shift-invariable images into shift-invariable intensity distribution images and displaying the shift-invariable intensity distribution images on said each shift-invariable image spatial light modulator.

16. An optical pattern recognition apparatus according to claim 14; wherein the converting means further comprises means for converting said each two-dimensional reference image and said each two-dimensional input image into respective shift-invariable intensity distribution images by computer image processing and for displaying the shift-invariable intensity distribution images on said each shift-invariable image spatial light modulator.

17. An optical pattern recognition apparatus according to claim 14; wherein the converting means further comprises means for converting the shift-invariable images into binarized shift-invariable intensity distribution images and then displaying the shift-invariable intensity distribution images on said each shift-invariable image spatial light modulator.

18. An optical pattern recognition apparatus according to claim 17; wherein said each shift-invariable image spatial light modulator comprises a light-addressed, shift-invariable image spatial light modulator including a ferroelectric liquid crystal having a bistable memory capability, and the converting means further comprises means for radiating the shift-invariable images onto each light-addressed, shift-invariable image spatial light modulator to store the binarized shift-invariable intensity distribution images.

19. An optical pattern recognition apparatus according to claim 17; wherein the converting means further comprises a photographing device for converting the shift-invariable images to image signals, binarizing means for binarizing the image signals, and
wherein said each shift-invariable image spatial light modulator comprises an electrically addressed shift-invariable image spatial light modulator for displaying the binarized image signal.

20. An optical pattern recognition apparatus according to claim 17; wherein each shift-invariable image spatial light modulator is an electrically addressed spatial light modulator using a ferroelectric liquid crystal having a bistable memory capability.

21. An optical pattern recognition apparatus, comprising: an optical coordinate converter unit for concerting simultaneously and in parallel at least one entered reference image and at least one entered input image from an entered coordinate system to a desired coordinate system to produce a coordinate-converted reference image of each entered reference image and a coordinate-converted input image of each entered input image; and a joint transform correlator for receiving said each coordinate-converted reference image and said each coordinate-converted input image and generating a correlation coefficient between said each coordinate-converted reference image and said each coordinate-converted input image so that a correlation between said each entered reference image and said each entered input image is obtained to effect pattern recognition in real time.

22. An optical pattern recognition apparatus according to claim 21; wherein the optical coordinate converter unit comprises image producing means for producing a two-dimensional reference image and a two-dimensional input image of said each entered reference image and said each entered input image, respectively, a spatial light modulator for displaying said each two-dimensional reference image and said each two-dimensional input image oriented in the entered coordinate system, and a coordinate conversion optical filter disposed adjacent to the spatial light modulator for converting said each two-dimensional reference image and said each two-dimensional input image from the entered coordinate system to the desired coordinate system to produce the coordinate-converted reference image of said each entered reference image and the coordinate-converted input image of said each entered input image.

23. An optical pattern recognition apparatus according to claim 22; wherein the spatial light modulator includes a ferroelectric liquid crystal having a bistable memory capability and comprises either a light-addressed modulator or an electrical-addressed modulator.

24. An optical pattern recognition apparatus according to claim 21; wherein the joint transform correlator comprises means for converting said each coordinate-converted reference image and said each coordinate-converted input image into respective coordinate-converted intensity distribution images, means for converting the respective coordinate-converted intensity distribution images into respective coherent images, means for converting the respective coherent images into a joint Fourier-transformed image, means for converting the joint Fourier-transformed image into a Fourier-transformed intensity distribution image, means for generating a correlation output image by Fourier-transforming the Fourier-transformed intensity distribution image, means for converting the correlation output image into a correlation signal, and means for processing the correlation signal to determine two-dimensional correlation coefficients between said each two-dimensional reference image and said each two-dimensional input image so that a correlation between said each entered reference image and said each entered input image is obtained to effect pattern recognition in real time.

25. An optical pattern recognition apparatus according to claim 24; wherein the means for converting said each coordinate-converted reference image and said each coordinate-converted input image into respective coordinate-converted intensity distribution images comprises means for converting said each coordinate-converted reference image and said each coordinate-converted input image into respective binarized coordinate-converted intensity distribution images.

26. An optical pattern recognition apparatus according to claim 24; wherein the means for converting the joint Fourier-transformed image into a Fourier-transformed intensity distribution image comprises means for converting the joint Fourier-transformed image into a binarized Fourier-transformed intensity distribution image.

27. An optical pattern recognition apparatus according to claim 21; further comprising a feedback circuit comprising normalizing means for normalizing the generated correlation coefficient between said each coordinate-converted reference image and said each coordinate-converted input image with a maximum correlation coefficient, and means for changing a subsequently generated correlation coefficient between said each coordinate-converted reference image and said each coordinate-converted input image depending on the normalized correlation coefficient between each said coordinate-converted reference image and said each coordinate converted input image.

28. An optical pattern recognition apparatus according to claim 21; wherein the optical coordinate converter unit comprises means for producing a two-dimensional reference image from said each entered reference image and a two-dimensional input image from said each entered input image, converting means for optically or electronically converting said each two-dimensional reference image and said each two-dimensional input image into a respective shift-invariable image and then displaying said each shift-invariable reference image and said each shift-invariable input image on at least one shift-invariable image spatial light modulator, and at least one coordinate conversion optical filter placed close to said each shift-invariable image spatial light modulator for producing said each coordinate-converted reference image of said each entered reference image and said each coordinate-converted input image of said each entered input image.

* * * * *

UNITED STATES PATENT AND TRADEMARK OFFICE
CERTIFICATE OF CORRECTION

PATENT NO. : 5,528,702
DATED : June 18, 1996
INVENTOR(S) : Yasuyuki MITSUOKA et al.

It is certified that error appears in the above-indentified patent and that said Letters Patent is hereby corrected as shown below:

On the title page, item [75] Inventors:

Change "Yasuyuki Mitsuoka; Tadao Iwaki, both of Tokyo, Japan" to --Yasuyuki Mitsuoka; Tadao Iwaki; Yasuhiro Takemura, all of Tokyo, Japan; Toshiharu Takesue, Chiba, Japan--.

Signed and Sealed this

Tenth Day of December, 1996

Attest:

BRUCE LEHMAN

Attesting Officer

Commissioner of Patents and Trademarks